(12) United States Patent
Garcia et al.

(10) Patent No.: US 11,676,275 B2
(45) Date of Patent: Jun. 13, 2023

(54) IDENTIFYING NUCLEOTIDES BY DETERMINING PHASING

(71) Applicant: Illumina, Inc., San Diego, CA (US)

(72) Inventors: Francisco Jose Garcia, San Diego, CA (US); Klaus Maisinger, Essex (GB); Stephen Tanner, San Diego, CA (US); John A. Moon, San Diego, CA (US); Tobias Mann, San Diego, CA (US); Michael Lawrence Parkinson, Reyrieux (FR); Anthony James Cox, Essex (GB); Haifang H. Ge, Essex (GB)

(73) Assignee: Illumina, Inc., San Diego, CA (US)

( * ) Notice: Subject to any disclaimer, the term of this patent is extended or adjusted under 35 U.S.C. 154(b) by 84 days.

(21) Appl. No.: 17/445,994

(22) Filed: Aug. 26, 2021

(65) Prior Publication Data

US 2022/0051407 A1    Feb. 17, 2022

Related U.S. Application Data

(63) Continuation of application No. 17/157,622, filed on Jan. 25, 2021, which is a continuation of application
(Continued)

(51) Int. Cl.
*G06T 7/00* (2017.01)
*G06T 7/33* (2017.01)
(Continued)

(52) U.S. Cl.
CPC .......... *G06T 7/0014* (2013.01); *G06T 7/0012* (2013.01); *G06T 7/246* (2017.01); *G06T 7/248* (2017.01); *G06T 7/33* (2017.01); *G06T 7/337* (2017.01); *G06T 7/90* (2017.01); *G06T 2207/10024* (2013.01); *G06T 2207/30024* (2013.01); *G06T 2207/30072* (2013.01)

(58) Field of Classification Search
CPC combination set(s) only.
See application file for complete search history.

(56) References Cited

U.S. PATENT DOCUMENTS 6,006,170 A    12/1999   Marcantonio
6,438,496 B1    8/2002   Yoshida et al.
(Continued)

FOREIGN PATENT DOCUMENTS

CA    2873146 A1 * 11/2013   ............. G16B 30/00
FR    2766496 A1 *  1/1999   ............. C07H 19/10
(Continued)

OTHER PUBLICATIONS

Adjeroh, et al., "On denoising and compression of DNA microarray images", Pattern Recognition, 39(12), 2006, 2478-2493.
(Continued)

*Primary Examiner* — Mekonen T Bekele
(74) *Attorney, Agent, or Firm* — Knobbe Martens Olson & Bear, LLP

(57) ABSTRACT

Methods and systems for analysis of image data generated from various reference points. Particularly, the methods and systems provided are useful for real time analysis of image and sequence data generated during DNA sequencing methodologies.

24 Claims, 4 Drawing Sheets

Related U.S. Application Data

No. 16/378,894, filed on Apr. 9, 2019, now abandoned, which is a continuation of application No. 15/354,540, filed on Nov. 17, 2016, now Pat. No. 10,304,189, which is a continuation of application No. 14/608,471, filed on Jan. 29, 2015, now Pat. No. 9,530,207, which is a continuation of application No. 13/006,206, filed on Jan. 13, 2011, now Pat. No. 8,965,076.

(60) Provisional application No. 61/321,029, filed on Apr. 5, 2010, provisional application No. 61/294,811, filed on Jan. 13, 2010.

(51) Int. Cl.
  *G06T 7/246* (2017.01)
  *G06T 7/90* (2017.01)

(56) References Cited

U.S. PATENT DOCUMENTS

| | | | |
|---|---|---|---|
| 6,839,454 | B1 | 1/2005 | Park |
| 6,969,589 | B2 | 11/2005 | Patil et al. |
| 6,973,053 | B1 | 12/2005 | Passman et al. |
| 7,033,754 | B2 | 4/2006 | Chee |
| 7,035,740 | B2 | 4/2006 | Kermani |
| 7,060,431 | B2 | 6/2006 | Chee et al. |
| 7,115,884 | B1 | 10/2006 | Walt |
| 7,226,734 | B2 | 6/2007 | Chee et al. |
| 7,285,384 | B2 | 10/2007 | Fan et al. |
| 7,348,181 | B2 | 3/2008 | Walt et al. |
| 7,455,971 | B2 | 11/2008 | Chee et al. |
| 7,668,697 | B2 | 2/2010 | Volkov et al. |
| 8,339,586 | B2 | 12/2012 | Zahniser |
| 8,965,076 | B2 | 2/2015 | Garcia et al. |
| 9,388,462 | B1 | 7/2016 | Eltoukhy et al. |
| 9,530,207 | B2 | 12/2016 | Garcia |
| 10,192,024 | B2 * | 1/2019 | Chen ............... G16B 25/00 |
| 10,304,189 | B2 | 5/2019 | Garcia et al. |
| 2002/0150909 | A1 | 10/2002 | Stuelpnagel et al. |
| 2003/0053097 | A1 | 3/2003 | Ohga |
| 2003/0196695 | A1 | 10/2003 | O'Connor et al. |
| 2004/0101191 | A1 | 5/2004 | Seul et al. |
| 2004/0218793 | A1 | 11/2004 | Corson et al. |
| 2005/0069189 | A1 | 3/2005 | Bartell |
| 2005/0129329 | A1 | 6/2005 | Kudo |
| 2005/0214825 | A1 | 9/2005 | Stuelpnagel |
| 2005/0256673 | A1 | 11/2005 | Hikida |
| 2005/0272086 | A1 | 12/2005 | Patil et al. |
| 2006/0041384 | A1 | 2/2006 | Kerman et al. |
| 2006/0083428 | A1 | 4/2006 | Ghosh et al. |
| 2006/0120584 | A1 | 6/2006 | Hillman et al. |
| 2006/0222226 | A1 | 10/2006 | Xia et al. |
| 2007/0091174 | A1 | 4/2007 | Kochi et al. |
| 2007/0250274 | A1 | 10/2007 | Volkov et al. |
| 2007/0274243 | A1 | 11/2007 | Yamaguchi |
| 2008/0026367 | A9 | 1/2008 | Cox et al. |
| 2008/0075380 | A1 | 3/2008 | Dube et al. |
| 2008/0182757 | A1 | 7/2008 | Heiner et al. |
| 2008/0231876 | A1 | 9/2008 | Harada |
| 2008/0273793 | A1 | 11/2008 | Oishi |
| 2009/0010535 | A1 | 1/2009 | Koishi |
| 2009/0041349 | A1 | 2/2009 | Suzuki et al. |
| 2010/0088255 | A1 | 4/2010 | Mann et al. |
| 2010/0138385 | A1 | 6/2010 | Palermiti |
| 2010/0246925 | A1 | 9/2010 | Nagatsuka et al. |
| 2010/0272334 | A1 | 10/2010 | Yamada et al. |
| 2011/0091065 | A1 | 4/2011 | Chandrashekar et al. |
| 2011/0211098 | A1 | 9/2011 | Bosco |
| 2011/0304659 | A1 | 12/2011 | Lee |
| 2012/0020537 | A1 | 1/2012 | Garcia et al. |
| 2012/0191678 | A1 | 7/2012 | Liu |
| 2012/0262703 | A1 | 10/2012 | Zahniser |
| 2012/0262704 | A1 | 10/2012 | Zahniser |
| 2012/0262705 | A1 | 10/2012 | Zahniser et al. |
| 2015/0125053 | A1 | 5/2015 | Vieceli |
| 2016/0018520 | A1 | 1/2016 | Hirai |

FOREIGN PATENT DOCUMENTS

| | | |
|---|---|---|
| WO | WO 1999/08233 | 2/1999 |
| WO | WO 2008/119046 | 10/2008 |
| WO | WO 2010/062913 | 6/2010 |

OTHER PUBLICATIONS

Elser, et al., "Searching with iterated maps", PNAS 104, 2007, 418-423.

Eltoukhy, et al., "Modeling and base-calling for Dna Sequencing-By-Synthesis", Acoustics, Speech and Signal Processing, 2006. ICASSP 2006 Proceedings. 2006 IEEE International Conference, May 2006, II-II.

Ewing, et al., "Base-calling of automated sequencer traces using phred. II. Error probabilities", Genome Research, 8, 1998, 186-194.

Herranz, et al., "Filtering techniques for the detection of Sunyaev-Zel'dovich clusters in multifrequency maps", Monthly Notices of the Royal Astronomical Society, 336, 2002, 10571068.

Herranz, et al., "Scale-adaptive filters for the detection/separation of compact sources", The Astrophysical Journal, 580, 2002, 610.

HiSeq 2000 obtained from PollTiGenomics, http://www.politigenomics.com/2010/01/hiseq-2000.html on Oct. 20, 2011, Jan. 12, 2010, 8 pages.

Hobson, et al., "A Bayesian Approach to discrete object detection in astronomical datasets".

Hua, Jianping et al., "Microarray BASICA: Background adjustment, segmentation, image compression and analysis of microarray images", Eurasip Journal on Applied Signal Processing, 2004(1), 2004, 92-107.

Illumina Sequencing,, "Reversing the Trend: More Bases with Less Computing", May 5, 2009, 2 pages.

Illumina Systems and Software,, "Complete Secondary Analysis Workflow for the Genome Analyzer", Technical Note, Oct. 19, 2009, 8 pages.

Illumina,, "Draft—Genome Analyzer Operations Guide".

Illumina,, "Genome Analyzer IIx Operations Guide", Apr. 2009.

Illumina,, "Genome Analyzer Operations Guide", Apr. 2009.

Illumina,, "Genome Analyzer Operations Guide", Aug. 2009.

Illumina,, "Genome Analyzer Operations Guide", Nov. 2009.

Illumina,, "RTA 1.4.15 update Release Notes", 2010.

Illumina,, "RTA Theory of Operation", Jun. 12, 2009.

Illumina,, "SCS 2.4 and RTA 1.4.6 Release Notes", Apr. 2010.

Illumina,, "SCS 2.5. and RTA 1.5. Release Notes", Sep. 2010.

Illumina,, "SCS 2.6 and RTA 1.6 Release Notes", Jan. 2011.

Irwin,, "Detectors and Data Analysis Techniques for Wide Filed Optical Imaging".

Kao, et al., "BayesCall: A model-based basecalling algorithm for high-throughput short-read sequencing", Genome Research, 19, 2009, 1884-1895.

Li, et al., "An estimate of the cross-talk matrix in four-dye fluorescence-based DNA sequencing", Electrophoresis, 20(7), 1999, 1433.

Lopez-Caniego, et al., "Filter design for the detection of compact sources based on the Neyman-Pearson detector".

Luo, et al., "Storage and transmission of microarray images", Drug Discovery Today, vol. 10 (No. 23/24), 2005, 1689-1695.

Margulies, et al., "Genome sequencing in microfabricated high-density picolitre reactors", Nature, vol. 437, 2005, 376-380 and Supplemental Materials.

Margulies, et al., "Supplemental Material 3", Nature, 437, 2005, 1-34.

Rahnenfuhrer, et al., "Hybrid clustering for microarray image analysis combining intensity and shape features", BMC Bioinformatics, 5, article 47, 2004.

Sanz, et al., "Optimal detection of sources on a homogeneous and isotropic background", The Astrophysical Journal 552, 2001, 484.

(56) References Cited

OTHER PUBLICATIONS

Shendure, et al., "Accurate Multiplex Polony Sequencing of an Evolved Bacterial Genome", Science, 309(5741), Sep. 9, 2005, 1728-1732.

\* cited by examiner

IDENTIFYING NUCLEOTIDES BY DETERMINING PHASING

RELATED APPLICATIONS

This application is a continuation of U.S. application Ser. No. 17/157,622 filed Jan. 25, 2021, which is a continuation of U.S. application Ser. No. 16/378,894 filed Apr. 9, 2019, which is a continuation of U.S. application Ser. No. 15/354,540 filed Nov. 17, 2016, now U.S. Pat. No. 10,304,189 issued May 28, 2019, which is a continuation of U.S. application Ser. No. 14/608,471 filed Jan. 29, 2015, now U.S. Pat. No. 9,530,207 issued Dec. 27, 2016, which is a continuation of U.S. application Ser. No. 13/006,206 filed Jan. 13, 2011, now U.S. Pat. No. 8,965,076 issued Feb. 24, 2015, which claims the benefit of U.S. Provisional Application No. 61/294,811 filed on Jan. 13, 2010 and U.S. Provisional Application No. 61/321,029 filed on Apr. 5, 2010, each of which is hereby incorporated by reference in its entirety.

BACKGROUND

Field of the Invention

Embodiments disclosed herein relate to methods and systems for analysis of image data generated at multiple reference points, and particularly to image and sequence data generated during DNA sequencing.

Description of the Related Art

The analysis of image data presents a number of challenges, especially with respect to comparing images of an item or structure that are captured from different points of reference. One field that exemplifies many of these challenges is that of nucleic acid sequence analysis.

The detection of specific nucleic acid sequences present in a biological sample has a wide variety of applications, such as identifying and classifying microorganisms, diagnosing infectious diseases, detecting and characterizing genetic abnormalities, identifying genetic changes associated with cancer, studying genetic susceptibility to disease, and measuring response to various types of treatment. A valuable technique for detecting specific nucleic acid sequences in a biological sample is nucleic acid sequencing.

Nucleic acid sequencing methodology has evolved significantly from the chemical degradation methods used by Maxam and Gilbert and the strand elongation methods used by Sanger. Today, there are a number of different processes being employed to elucidate nucleic acid sequence. A particularly popular sequencing process is sequencing-by-synthesis. One reason for its popularity is that this technique can be easily applied to massively parallel sequencing projects. For example, using an automated platform, it is possible to carry out hundreds of thousands of sequencing reactions simultaneously. Sequencing-by-synthesis differs from the classic dideoxy sequencing approach in that, instead of generating a large number of sequences and then characterizing them at a later step, real time monitoring of the incorporation of each base into a growing chain is employed. Although this approach might be viewed as slow in the context of an individual sequencing reaction, it can be used for generating large amounts of sequence information in each sequencing cycle when hundreds of thousands to millions of reactions are performed in parallel. Despite these advantages, the vast size and quantity of sequence information obtained through such methods can limit the speed and quality of analysis of sequence data. Thus, there is a need for methods and systems which improve the speed and accuracy of analysis of nucleic acid sequencing data.

SUMMARY

The present technology relates to methods and systems for analysis of image data. In particular exemplary embodiments, the technology relates to methods and systems for analysis of image data generated during nucleic acid sequencing. In some embodiments, such methods and systems include data acquisition and/or storage functions. In some embodiments of the present invention, such methods and systems permit the analysis of image data from sequencing processes with improved speed and accuracy.

In some embodiments of the technology described herein, methods of performing image analysis are provided that allows image analysis to occur while storing large amounts of image data. The methods can include performing image analysis in the background of a process that preferentially acquires image data. Such methods can be performed by a single processor capable of time-division multiplexing or other multithreading process. In other embodiments, such methods are implemented using multiple processes that may or may not overlap temporally, for example, by utilizing two or more separate processors. An advantage that may be realized by such methods is a reduction in data storage requirements since analyzed data typically requires less storage space than the image data from which the analyzed data is derived.

In certain aspects, the methods described herein can include the steps of providing a first data set to store on a storage device; providing a second data set for analysis; processing the first data set and the second data set; wherein the processing comprises acquiring and storing the first data set on the storage device and analyzing the second data set when the processor is not acquiring the first data set. In certain aspects, the processing step includes identifying at least one instance of a conflict between acquiring the first data set and analyzing the second data set; and resolving the conflict in favor of acquiring image data such that acquiring the first data set is given priority. In some aspects, the first data set and the second data set are the same data set. In other aspects, the first data set and the second data set are not the same. In certain aspects, preliminary processing can be performed and follow-on processing such as base-calling and quality scoring can be performed separately.

In certain aspects of the methods described herein, the first data set comprises image files. In certain aspects, the second data set comprises image files. In certain aspects, the second data set comprises data obtained from an analysis of image files. In certain aspects, analyzing the second data set comprises advancing a file through a series of analyses, wherein each subsequent analysis in the series advances a file from a more preliminary state to a more advanced state. In certain aspects, advancing includes identifying at least one instance of a conflict between analyzing one file in an advanced state and analyzing a file that is in a more preliminary state; and resolving the conflict in favor of analyzing a file that is in a more preliminary state. In some aspects, the data obtained comprises one or more of the features selected from the group consisting of: the location of a spot within an image file; the intensity of a spot in an image file; the value of noise associated with an image file; the identity of a spot as representing a chemical feature; and a quality score associated with a spot in an image file.

In particular embodiments, a method of performing image analysis in real time is provided. The method can include steps of (a) providing a specimen having multiple features; (b) providing a detector directed to the specimen; (c) subjecting the specimen to multiple cycles of treatment and image acquisition, wherein the treatment changes a characteristic of at least a subset of the features in the specimen and the detector acquires images that distinguishes the changes of the characteristic; and (d) transferring the images from the detector to a processor, wherein the processor (i) transfers the images to least one storage capacity, (ii) analyzes the images to register multiple images to a template and identify a sequence of changes in the characteristics for the features in the specimen, thereby producing analyzed data, and (iii) transfers the analyzed data to the at least one storage capacity, wherein the processor identifies at least one instance of a conflict between transferring a first image and analyzing a second image; and the processor resolves the conflict in favor of transferring the first image prior to analyzing the second image.

In some aspects, the specimen can include a nucleic acid array and the features can include nucleic acids having different nucleotide sequences. The treatment that occurs in multiple cycles of the method can include adding reagents for a nucleic acid sequencing technique. Embodiments carried out for a nucleic acid array can include a processor that further determines at least a portion of the nucleotide sequence present at individual features of the nucleic acid array.

The detector that is used in a method of performing image analysis in real time can include a camera. The camera can acquire images that distinguish changes in the color of at least a subset of the features in a specimen. For example, color changes resulting from cycles of a sequencing technique can be distinguished using a camera.

A processor used in a method of performing image analysis in real time can also be used to identify at least one instance of a conflict between registering the multiple images and identifying the sequence of changes, and the processor can resolve the conflict in favor of registering the multiple images prior to identifying the sequence of changes.

In some aspects of a method of performing image analysis in real time the processor can discard a first image after the analyzing of the image data and after the transferring of the analyzed data. The processor can further discard the first image before completing the multiple cycles of treatment and image acquisition to generate at least a second image, wherein the processor can register the first image and the second image to a template and identify a sequence of changes in the characteristics for features in the first image and in the second image.

Also provided herein are systems for performing image analysis. The systems can include a processor; a storage capacity; and a program for image analysis, the program comprising instructions for processing a first data set for storage and the second data set for analysis, wherein the processing comprises acquiring and storing the first data set on the storage device and analyzing the second data set when the processor is not acquiring and/or storing the first data set. In certain aspects, the program includes instructions for identifying at least one instance of a conflict between acquiring and/or storing the first data set and analyzing the second data set; and resolving the conflict in favor of acquiring and/or storing image data such that acquiring and/or storing the first data set is given priority. In certain aspects, the first data set comprises image files obtained from an optical imaging device, such as a charge coupled device (CCD) camera or a complementary metal-oxide semiconductor (CMOS) camera. In certain aspects, the optical imaging device can be directly integrated with the system. In other embodiments, the optical imaging device can be removably coupled to the system. In some aspects, the optical imaging device comprises a light source and a detection device.

A particularly useful imaging system can include (a) a detector; (b) at least one storage capacity; and (c) a processor configured for (i) transferring image data from the detector to the to least one storage capacity, (ii) analyzing the image data to produce analyzed data, wherein the analyzing of the image data set includes registering multiple image data sets to a template and identifying a different characteristic of a feature between two or more images, and (iii) transferring the analyzed data to the at least one storage capacity, wherein the processor comprises instructions for identifying at least one instance of a conflict between transferring a first image data set and analyzing a second image data set; and resolving the conflict in favor of transferring image data such that the transferring of the first image data set is given priority over the analyzing of the second image data set. The processor can further include instructions for identifying at least one instance of a conflict between the registering of the multiple image data sets and the identifying of the different characteristic of the feature between two or more images; and for resolving the conflict in favor of registering such that the registering is given priority over the identifying. The different characteristic of a feature between two or more images that is identified can be a change in color.

The processor that forms part of an imaging system can further include instructions for analyzing a sequence of changes for the different characteristic of the feature between the two or more images. Moreover, the processor can further include instructions for determining a nucleotide sequence at the individual feature from the sequence of changes.

In particular embodiments, the processor is further configured for discarding the image data after the analyzing of the image data and after the transferring of the analyzed data. If desired, the processor can be further configured for discarding the image data before transferring a second set of image data from the detector to the at least one storage capacity.

Also provided herein are methods of tracking the location of features of a specimen across a set of images of the specimen captured at different reference points. The methods can comprise the steps of: (a) selecting a subset of images, wherein the images of the subset depict signals corresponding to features of the specimen, and wherein the images of the subset are captured at different reference points; (b) selecting a primary image from the subset of images; (c) registering the signals depicted in the images of the subset of images with the signals depicted in the primary image so as to determine the location of the signals depicted in the images with respect to each other, thereby producing signal clumps; (d) selecting a signal from each of the signal clumps, thereby forming a template that permits the identification of the locations of features of the specimen; and (e) registering remaining images in the set of images with the template. In some aspects, the primary image comprises either a single image or a compilation of multiple merged images.

In certain aspects, the specimen can comprise at least one tile comprising an array of molecules. In certain aspects, the specimen comprises a plurality of tiles. In certain aspects, the array of molecules comprises a plurality of features. In certain aspects, a feature of the plurality of features comprises multiple copies of a molecule of the array of molecules. In certain aspects, the molecule comprises a nucleic acid. Multiple copies of nucleic acids at a feature can be sequenced, for example, by providing a labeled nucleotide base to the array of molecules, thereby extending a primer hybridized to a nucleic acid within a feature so as to produce a signal corresponding to a feature comprising the nucleic acid. In preferred embodiments, the nucleic acids within a feature are identical or substantially identical to each other.

In some of the image analysis methods described herein, each image in the set of images includes colors signals, wherein a different color corresponds to a different nucleotide base. In some aspects, each image of the set of images comprises signals having a single color selected from at least four different colors. In certain aspects, each image in the set of images comprises signals having a single color selected from four different colors.

With respect to certain methods described herein, nucleic acids can be sequenced by providing, four different labeled nucleotide bases to the array of molecules so as to produce four different images, each image comprising signals having a single color, wherein the signal color is different for each of the four different images, thereby producing a cycle of four color images that corresponds to the four possible nucleotides present at a particular position in the nucleic acid. In certain aspects, such methods can further comprise providing additional labeled nucleotide bases to the array of molecules, thereby producing a plurality of cycles of color images.

In some aspects of the image analysis methods described herein, selecting a primary image further comprises selecting the four different color images from a single cycle within the subset of images; merging signals from at least two different color images of each cycle into a candidate primary image for the cycle; repeating the selecting and merging steps, thereby forming a plurality of candidate primary images; and selecting the candidate primary image from among the candidate primary images that includes the most signals, thereby obtaining a primary image.

In some aspects, the image analysis methods described herein further comprise the step of selecting a secondary image, wherein the secondary image is the candidate primary image that includes the second most signals. In certain aspects, the secondary image comprises either a single image or a compilation of multiple merged images.

In certain aspects, the method further comprises registering the signals from the secondary image with the signals from the primary image. In certain aspects, the method further comprises registering signals from nonselected images with the signals from the secondary image, wherein the nonselected images are obtained from the image cycle from which the primary image was obtained. In certain aspects, the method further comprises registering signals from remaining images in the subset with signals from the primary image.

In some aspects of the image analysis methods described herein, the signals from at least two different color images are subject to cross-talk, wherein cross-talk between two signal channels allows signals from one color image to appear in the other color image. In certain aspects, the signals from at least two different color images comprise signals corresponding to A and C.

In some aspects of the image analysis methods described herein, the signals from at least two different color images are not subject to cross-talk or exhibit only insubstantial or insignificant cross-talk. In certain aspects, the signals from at least two different color images comprise signals corresponding to A and G or A and T. In other aspects, the signals from at least two different color images comprise signals corresponding to T and C, T and A, G and C or G and A. In such methods, where channels that do not exhibit appreciable cross-talk are used for registration, image alignment or registration can be performed by determining the non-alignment between non-cross-talking channels in the same cycle. Accordingly, in some embodiments the step of registering the signals depicted in the images of the subset of images can include determining a minimum, near minimum or relatively low cross-correlation between channels which are not expected to exhibit appreciable cross-talk.

In some embodiments of the image analysis methods described herein, image registration can be performed over a wide range of densities. In some embodiments, image registration can occur over a range from about 10 clusters/mm$^2$, to about 1,000,000 clusters/mm$^2$. In other embodiments, registration can occur over a range from about 100,000 clusters/mm$^2$ to about 1,000,000 clusters/mm$^2$.

In some aspects, the image analysis methods described herein are utilized to generate a template from a subset of images, wherein the template permits the identification of the location of a feature of a specimen. In certain aspects, the template that permits the identification of the locations of features of the specimen is saved to a locations file.

Also provided herein are systems for tracking the location of features of a specimen across a set of images of the specimen captured at different reference points. The systems can comprise: a processor; a storage capacity; and a program for tracking the location of features across different images, the program comprising instructions for: selecting a subset of images, wherein the images of the subset depict signals corresponding to features of the specimen, and wherein the images of the subset are captured at different reference points; selecting a primary image from the subset of images; registering the signals depicted in the images of the subset of images with the signals depicted in the primary image so as to determine the location of the signals depicted in the images with respect to each other, thereby producing signal clumps; selecting a signal from each of the signal clumps, thereby forming a template that permits the identification of the locations of features of the specimen; and registering remaining images in the set of images with the template. In certain aspects, the primary image comprises either a single image or a compilation of multiple merged images.

Also provided herein are systems for tracking the location of features of an array across a set of images of the array captured at different time points. The systems can comprise: a processor; a storage capacity; and a program for tracking the location of features across different images, the program comprising instructions for: selecting a subset of images, wherein the images of the subset depict signals corresponding to features of the array, and wherein the images of the subset are captured at different time points; selecting a primary image from the subset of images; and registering the signals depicted in the images of the subset of images with the signals depicted in the primary image, so as to determine the location of the signals depicted in the images with respect to each other, thereby producing signal clumps; selecting a signal from each of the signal clumps, thereby forming a template that permits the identification of the locations of features of the array; and registering remaining images in the set of images with the template.

In some aspects of the above embodiments, the system can comprise a flow cell. In some aspects, the flow cell comprises lanes, or other configurations, of tiles, wherein at least some of the tiles comprise one or more arrays of features. In some aspects, the features comprise a plurality of molecules such as nucleic acids. In certain aspects, the flow cell is configured to deliver a labeled nucleotide base to an array of nucleic acids, thereby extending a primer hybridized to a nucleic acid within a feature so as to produce a signal corresponding to a feature comprising the nucleic acid. In preferred embodiments, the nucleic acids within a feature are identical or substantially identical to each other.

In some of the systems for image analysis described herein, each image in the set of images includes color signals, wherein a different color corresponds to a different nucleotide base. In some aspects, each image of the set of images comprises signals having a single color selected from at least four different colors. In some aspects, each image in the set of images comprises signals having a single color selected from four different colors. In some of the systems described herein, nucleic acids can be sequenced by providing four different labeled nucleotide bases to the array of molecules so as to produce four different images, each image comprising signals having a single color, wherein the signal color is different for each of the four different images, thereby producing a cycle of four color images that corresponds to the four possible nucleotides present at a particular position in the nucleic acid. In certain aspects, the system comprises a flow cell that is configured to deliver additional labeled nucleotide bases to the array of molecules, thereby producing a plurality of cycles of color images.

In certain aspects of the systems for image analysis described herein, the program for tracking the location of features across different images further comprises instructions for: selecting the four different color images from a single cycle within the subset of images; merging signals from at least two different color images of each cycle into a candidate primary image for the cycle; repeating the selecting and merging steps, thereby forming a plurality of candidate primary images; and selecting the candidate primary image from among the candidate primary images that includes the most signals, thereby obtaining a primary image.

In certain aspects, the program for tracking the location of features across different images further comprises instructions for selecting a secondary image, wherein the secondary image is the candidate primary image that includes the second most signals. In certain aspects, the secondary image comprises either a single image or a compilation of multiple merged images.

In certain aspects, the program for tracking the location of features across different images further comprises instructions for registering the signals from the secondary image with the signals from the primary image. In certain aspects, the program for tracking the location of features across different images further comprises instructions for registering signals from nonselected images with the signals from the secondary image, wherein the nonselected images are obtained from the image cycle from which the primary image was obtained. In certain aspects, the program for tracking the location of features across different images further comprises instructions for registering signals from remaining images in the subset with signals from the primary image.

In some aspects of the systems for image analysis described herein, the signals from at least two different color images are subject to cross-talk, wherein cross-talk between two signal channels allows signals from one color image to appear in the other color image. In certain aspects, the signals from at least two different color images comprise signals corresponding to A and C.

In some aspects of the systems for image analysis described herein, the signals from at least two different color images are not subject to cross-talk or exhibit only insubstantial or insignificant cross-talk. In certain aspects, the signals from at least two different color images comprise signals corresponding to A and G or A and T. In other aspects, the signals from at least two different color images comprise signals corresponding to T and C, T and A, G and C or G and A. In such systems, where channels that do not exhibit appreciable cross-talk are used for registration, image alignment or registration can be performed by determining the non-alignment between non-cross-talking channels in the same cycle. Accordingly, in some embodiments the instructions for registering the signals depicted in the images of the subset of images can include determining a minimum, near minimum or relatively low cross-correlation between channels which are not expected to exhibit appreciable cross-talk.

In some aspects, the systems for image analysis described herein are utilized to generate a template from a subset of images, wherein the template permits the identification of the location of a feature of a specimen. In certain aspects, the template that permits the identification of the locations of features of the specimen is saved to a locations file.

In some embodiments of the systems for image analysis described herein, image registration can be performed over a wide range of densities. In some embodiments, image registration can occur over a range from about 10 clusters/$mm^2$, to about 1,000,000 clusters/$mm^2$. In other embodiments, registration can occur over a range from about 100,000 clusters/$mm^2$ to about 1,000,000 clusters/$mm^2$.

Also provided herein are methods of generating a template for image registration. The methods can comprise the steps of: (a) selecting a subset from a set of images of a specimen, the subset of images comprising a plurality of image cycles, wherein the images of the subset depict signals corresponding to features of the specimen, and wherein the images of the subset are captured at different reference points; (b) selecting a primary image from the subset of images, wherein the primary image is the image having the most signals from the subset of images; (c) selecting a secondary image from the subset of images, wherein the secondary images is the image having the second most signals from the subset of images; (d) registering the signals from the secondary image with the signals from the primary image; (e) registering signals from nonselected images with the signals from the secondary image, wherein the nonselected images are obtained from the image cycle from which the primary image was obtained; (f) registering signals from remaining images in the subset with signals from the primary image so as to determine the location of the signals depicted in the images with respect to each other, thereby producing signal clumps; and (g) selecting a signal from each of the signal clumps, thereby forming a template that permits the identification of the locations of features of the specimen.

In certain aspects of the methods described herein, the primary image comprises either a single image or a compilation of multiple merged images. In some aspects, the secondary image comprises either a single image or a compilation of multiple merged images. In some aspects, the primary and secondary images are used to generate a template that permits the identification of the location of a feature of the specimen. In certain aspects, the template that permits the identification of the locations of features of the specimen is saved to a locations file.

Also provided herein are systems of generating a template for image registration. The systems can comprise: a processor; a storage capacity; and a program for generating a template for image registration, the program comprising instructions for: (a) selecting a subset from a set of images of a specimen, the subset of images comprising a plurality of image cycles, wherein the images of the subset depict signals corresponding to features of the specimen, and wherein the images of the subset are captured at different reference points; (b) selecting a primary image from the subset of images, wherein the primary image is the image having the most signals from the subset of images; (c) selecting a secondary image from the subset of images, wherein the secondary images is the image having the second most signals from the subset of images; (d) registering the signals from the secondary image with the signals from the primary image; (e) registering signals from nonselected images with the signals from the secondary image, wherein the nonselected images are obtained from the image cycle from which the primary image was obtained; (f) registering signals from remaining images in the subset with signals from the primary image so as to determine the location of the signals depicted in the images with respect to each other, thereby producing signal clumps; and (g) selecting a signal from each of the signal clumps, thereby forming a template that permits the identification of the locations of features of the specimen.

In certain aspects of the systems described herein, the primary image comprises either a single image or a compilation of multiple merged images. In some aspects, the secondary image comprises either a single image or a compilation of multiple merged images. In some aspects, the primary and secondary images are used to generate a template that permits the identification of the location of a feature of the specimen. In certain aspects, the template that permits the identification of the locations of features of the specimen is saved to a locations file.

Also provided herein is a method of selecting a signal from a cluster of signals in an image. The method can comprise the steps of: discarding any signals that do not appear within a cluster of signals, the cluster of signals having a defined cluster radius; and selecting the signal with the highest intensity of signals within a cluster. In certain aspects, the selecting step further comprises discarding any signal which already has a signal neighbor within the cluster radius.

In certain aspects, the selecting step further comprises ordering the signals. In certain aspects, ordering the signals comprises ordering the signals by detection count. In some embodiments, the detection count is equivalent to the number of times a signal is detected within a selected radius. In some embodiments, the selected radius is measured from a pre-selected signal. In some embodiments, the pre-selected signal can be the first signal detected within a group of signals. In other embodiments, the pre-selected signal can be the brightest signal in a predicted feature location. In still other embodiments, the selected radius is established without reference to a pre-selected signal. In preferred embodiments, the selected radius is about 0.5 pixels; however, it will be appreciated that the selected radius may be larger or smaller depending on a variety of factors which include, but are not limited to, the quality of data acquisition and/or the end user's needs.

In certain aspects, ordering the signals comprises ordering the signals by intensity or brightness. In certain aspects, the intensity or brightness is selected from the group consisting of brightness relative to neighboring pixels, brightness relative to a noise estimate, absolute brightness, brightness as a percentile, and extracted (bilinear) brightness. In preferred aspects, the brightness is brightness relative to neighboring pixels. In some such aspects, the neighboring pixels may be present within a defined radius. In some preferred aspects, the defined radius is lowered in response to increased signal density. In such preferred aspects, the defined radius can be, for example, 2.0 pixels, 1.5 pixels 1.0 pixel or less than 1.0 pixel. In certain aspects, ordering the signals comprises ordering the signals by detection count then ordering the signals by intensity.

In other embodiments of the signal selection methods described herein, additional or alternate factors influencing the selection are employed. In some such embodiments, signal selection methods include a chastity determination. In exemplary embodiments, the chastity of a spot, for example, the intensity of a cluster in different color channels, is calculated and used in subsequent comparison or determination steps. In certain embodiments, the procedure for including a chastity determination in spot selection can comprise (a) generating a list of identified spots and intensities for each template cycle; (b) providing a preliminary base call for each spot; (c) determining the chastity of each base call; (d) identifying spots with two or more chastity base call failures; (e) eliminating spots having chastity values lower than a threshold value; (f) determining the sample diversity and/or the probability that clusters will match base calls by chance; and (g) analyzing spots in iteration from highest to lowest chastity over template cycles, wherein the analysis can include one or more steps of: (i) discarding the spot being analyzed if another spot has been previously assigned within a first radius; and (ii) discarding the spot being analyzed if another spot has been previously assigned within a second radius and the base calls for the spot meet a threshold chastity value.

It will be appreciated that steps in the spot selection methods described in the previous paragraph need not include every step set forth therein. While spot selection methods that utilize chastity may include a chastity determination step, other steps in spot selection may be eliminated or substituted.

In some embodiments of the above-described method, the first and second radii have different values. In other embodiments, the first and second radii have the same values.

It will also be appreciated that the threshold value of chastity can be determined by a skilled artisan in view of the required application. In some embodiments, the threshold chastity values range from about 0.5 to about 0.99.

Also provided herein is a system for selecting a signal from a cluster of signals in an image. The system can comprise: a processor; a storage capacity; and a program for selecting a signal from a cluster of signals, the program comprising instructions for: discarding any signals that do not appear within a cluster of signals, the cluster of signals having a defined cluster radius; and selecting the signal with the highest intensity of signals within a cluster. In certain aspects, selecting further comprises discarding any signal which already has a signal neighbor within the cluster radius.

In certain aspects, the selecting step further comprises ordering the signals. In certain aspects, ordering the signals comprises ordering the signals by detection count. In some embodiments, the detection count is equivalent to the number of times a signal is detected within a selected radius. In some embodiments, the selected radius is measured from a pre-selected signal. In some embodiments, the pre-selected signal can be the first signal detected within a group of signals. In other embodiments, the pre-selected signal can be the brightest signal in a predicted feature location. In still other embodiments, the selected radius is established without reference to a pre-selected signal. In preferred embodiments, the selected radius is about 0.5 pixels; however, it will be appreciated that the selected radius may be larger or smaller depending on a variety of factors which include, but are not limited to, the quality of data acquisition and/or the end user's needs.

In certain aspects, ordering the signals comprises ordering the signals by intensity or brightness. In certain aspects, the intensity or brightness is selected from the group consisting of brightness relative to neighboring pixels, brightness relative to a noise estimate, absolute brightness, brightness as a percentile, and extracted (bilinear) brightness. In preferred aspects, the brightness is brightness relative to neighboring pixels. In some such aspects, the neighboring pixels may be present within a defined radius. In some preferred aspects, the defined radius is lowered in response to increased signal density. In such preferred aspects, the defined radius can be, for example, 2.0 pixels, 1.5 pixels, 1.0 pixel or less than 1.0 pixel. In certain aspects, ordering the signals comprises ordering the signals by detection count then ordering the signals by intensity.

In additional embodiments of systems for selecting a signal described herein, additional or alternate factors influencing the selection are employed. In some such embodiments, such systems include instructions for determining chastity. In exemplary embodiments, the chastity of a spot, for example, the intensity of a cluster in different color channels, is calculated and used in subsequent comparison or determination steps. In certain embodiments, the instructions for including a chastity determination in spot selection can comprise (a) generating a list of identified spots and intensities for each template cycle; (b) providing a preliminary base call for each spot; (c) determining the chastity of each base call; (d) identifying spots with two or more chastity failures; (e) eliminating spots having chastity values lower than a threshold value; (f) determining the sample diversity and/or the probability that clusters will match base calls by chance; and (g) analyzing spots in iteration from highest to lowest chastity over template cycles, wherein the analysis can include one or more steps of: (i) discarding the spot being analyzed if another spot has been previously assigned within a first radius; and (ii) discarding the spot being analyzed if another spot has been previously assigned within a second radius and the base calls for the spot meet a threshold chastity value.

It will be appreciated that steps described in the previous paragraph need not include every step set forth therein. While systems for performing spot selection that utilize chastity may include instructions for chastity determination, other steps in spot selection may be eliminated or substituted.

In some embodiments of the above-described system for spot selection, the first and second radii have different values. In other embodiments, the first and second radii have the same values.

It will also be appreciated that the threshold value of chastity can be determined by skilled artisan in view of the required application. In some embodiments, the threshold chastity values range from about 0.5 to about 0.99.

In addition to the foregoing aspects, also provided herein are methods of assigning colors to features in an image. In some embodiments, such methods can comprise the steps of: determining a preliminary color matrix for a feature; evaluating quality of the preliminary color assignment; refining the preliminary color matrix based on the color assignment, thereby forming a refined color matrix; and making a final color assignment for a feature based on the refined color matrix. In certain aspects, the methods can further comprise the step of making a preliminary color assignment for a feature based on the preliminary color matrix, wherein the preliminary color assignment is made prior to the evaluating step.

In certain aspects described herein, the refined color matrix can be used to correct for cross-talk between channels. In some aspects, the step of refining the preliminary color matrix comprises re-orthogonalizing signal intensities for the preliminary color matrix at one or more features. In certain aspects, the refining step comprises re-normalizing signal intensities for the preliminary color matrix at one or more features. In certain preferred aspects, the refining step comprises both re-orthogonalizing and re-normalizing signal intensities for the preliminary color matrix at one or more features.

Also provided herein is a method of identifying a nucleotide base in a nucleic acid sequence. The method can comprise: determining the intensity of each differently colored signal present at a particular feature on an array at a particular time, wherein each differently colored signal corresponds to a different nucleotide base; repeating the determining step for a plurality of features on an array at the particular time; refining the signal intensity for the plurality of features then repeating the determining step for the plurality of features; and selecting for one or more features of the plurality of features the refined signal having the highest intensity, wherein the signal having the highest intensity at a particular feature corresponds to the identity of the nucleotide base present at the particular feature.

In some aspects of the methods for identifying a nucleotide base described herein, the refining step comprises re-orthogonalizing the signal intensities for the plurality of features. In certain aspects, the refining step comprises re-normalizing the signal intensities for the plurality of features. In certain preferred aspects, the refining step comprises both re-orthogonalizing and re-normalizing the signal intensities for the plurality of features.

Additional methods for assigning colors to features in an image involve forming an alternate color matrix to correct for cross-talk between channels. In some embodiments, the steps of such methods comprise (a) obtaining intensity measurements from two channels that exhibit cross-talk; (b) determining the distribution of the intensity measurements; (c) identifying local maxima in the distribution, thereby generating a cross-talk coefficient; (d) and normalizing the two channels using the cross-talk coefficient. In some embodiments the two channels are A and C. In other embodiments, the two channels are G and T.

In preferred embodiments, determining the distribution of the intensity measurements comprises generating a histogram of intensity data. In some such embodiments, the intensity measurements from the two channels are first converted to polar coordinates. In preferred embodiments, a histogram generated from such intensity data comprises a radius-weighted histogram.

In additional embodiments of the methods for assigning colors to an image, normalization further comprises a base calling step, a step of determining the chastity associated with the base call or both.

Also provided herein is a system for refining signals within an image, the system comprising: a processor; a storage capacity; and a program for assigning colors to features in an image, the program comprising instructions for: determining a preliminary color matrix for a feature; evaluating quality of the preliminary color assignment; refining the preliminary color matrix based on the color assignment, thereby forming a refined color matrix; and making a final color assignment for a feature based on the refined color matrix.

In certain aspects described herein, the program further comprises instructions for making a preliminary color assignment for a feature based on the preliminary color matrix. In certain aspects, the refined color matrix can be used to correct for cross-talk between channels. In some aspects, the instructions for refining the preliminary color matrix comprise re-orthogonalizing signal intensities for the preliminary color matrix at one or more features. In certain aspects, the instructions for refining the preliminary color matrix comprise re-normalizing signal intensities for the preliminary color matrix at one or more features. In certain aspects, the instructions for refining the preliminary color matrix comprise both re-orthogonalizing and re-normalizing signal intensities for the preliminary color matrix at one or more features.

Also provided herein is a system for identifying a nucleotide base in a nucleic acid sequence, the system comprising: a processor; a storage capacity; and a program for identifying a nucleotide base in a nucleic acid sequence, the program comprising instructions for: determining the intensity of each differently colored signal present at a particular feature on an array at a particular time, wherein each differently colored signal corresponds to a different nucleotide base; repeating the determining step for a plurality of features on an array at the particular time; refining the signal intensity for the plurality of features then repeating the determining step for the plurality of features; and selecting for one or more features of the plurality of features the refined signal having the highest intensity, wherein the signal having the highest intensity at a particular feature corresponds to the identity of the nucleotide base present at the particular feature.

In some aspects of the systems for identifying a nucleotide base described herein, the instructions for refining comprise re-orthogonalizing the signal intensities for the plurality of features. In certain aspects, the instructions for refining comprise re-normalizing the signal intensities for the plurality of features. In certain preferred aspects, the instructions for refining comprise both re-orthogonalizing and re-normalizing the signal intensities for the plurality of features. In certain aspects, the system further comprises a flow cell.

Additionally, provided herein is a system for refining signals within an image, the system comprising: a processor; a storage capacity; and a program for assigning colors to features in an image, the program comprising instructions for forming an alternate color matrix to correct for cross-talk between channels. In some embodiments, systems comprise instructions for (a) obtaining intensity measurements from two channels that exhibit cross-talk; (b) determining the distribution of the intensity measurements; (c) identifying local maxima in the distribution, thereby generating a cross-talk coefficient; (d) and normalizing the two channels using the cross-talk coefficient. In some embodiments the two channels are A and C. In other embodiments, the two channels are G and T.

In preferred embodiments, determining the distribution of the intensity measurements comprises generating a histogram of intensity data. In some such embodiments, the intensity measurements from the two channels are first converted to polar coordinates. In preferred embodiments, a histogram generated from such intensity data comprises a radius-weighted histogram.

In additional embodiments of the systems for assigning colors to an image, normalization further comprises a base calling step, a step of determining the chastity associated with the base call or both.

Also provided herein are methods of evaluating the quality of a base call from a sequencing read. In some embodiments, the methods can comprise the steps of: calculating a set of predictor values for the base call; and then using the predictor values to look up a quality score in a quality table. In certain aspects, the quality table is generated using Phred scoring on a calibration data set, the calibration set being representative of run and sequence variability. In certain aspects, the predictor values are selected from the group consisting of: approximate homopolymer; intensity decay; penultimate chastity; signal overlap with background (SOWB); and shifted purity G adjustment.

In certain aspects, the method further comprises the steps of: discounting unreliable quality scores at the end of each read; identifying reads where the second worst chastity in the first 25 base calls is below a pre-established threshold; and marking the reads as poor quality data. In certain aspects, the method further comprises using an algorithm to identify a threshold of reliability. In certain aspects, reliable base calls comprise q-values, or other values indicative of data quality or statistical significance, above the threshold and unreliable base calls comprise q-values, or other values indicative of data quality or statistical significance, below the threshold. In certain aspects, the algorithm comprises an End Anchored Maximal Scoring Segments (EAMSS) algorithm. In certain aspects, the algorithm uses a Hidden Markov Model that identifies shifts in the local distributions of quality scores.

Also provided herein is a system for evaluating the quality of a base call from a sequencing read, the system comprising: a processor; a storage capacity; and a program for evaluating the quality of a base call from a sequencing read, the program comprising instructions for: calculating a set of predictor values for the base call; and then using the predictor values to look up a quality score in a quality table. In certain aspects, the quality table is generated using Phred scoring on a calibration data set, the calibration set being representative of run and sequence variability. In certain aspects, the predictor values are selected from the group consisting of: approximate homopolymer; intensity decay; penultimate chastity; signal overlap with background (SOWB); and shifted purity G adjustment.

In certain aspects, the system can further comprise instructions for: discounting unreliable quality scores at the end of each read; identifying reads where the second worst chastity in the first 25 base calls is below a pre-established threshold; and marking the reads as poor quality data. In certain aspects, the system further comprises instructions for using an algorithm to identify a threshold of reliability. In certain aspects, the reliable base calls comprise q-values, or other values indicative of data quality or statistical significance, above the threshold and unreliable base calls comprise q-values, or other values indicative of data quality or statistical significance, below the threshold. In certain aspects, the algorithm comprises an End Anchored Maximal Scoring Segments (EAMSS) algorithm. In certain aspects, the algorithm uses a Hidden Markov Model that identifies shifts in the local distributions of quality scores.

Also provided herein are methods of verifying that sequence data obtained from a specimen comprising a plurality of arrays is non-artifactual. In some embodiments, such methods, comprise incorporating a control nucleic acid into one or more arrays of the plurality of arrays and verifying that the control nucleic acid has been properly sequenced. In certain aspects, the control nucleic acid has a known sequence. In some such aspects, the control nucleic acid can be randomly distributed on the specimen so as to form all or part of one or more arrays in the plurality of arrays. In other such aspects, the control nucleic acid can be arbitrarily distributed on the specimen so as to form all or part of one or more arrays in the plurality of arrays. In certain aspects, the control nucleic acid is derived from an organism with a substantially stable and/or substantially non-variable genome. In certain aspects, the control nucleic acid is obtained from, or otherwise derived from, a bacteriophage genome. In certain aspects, the bacteriophage genome is the Phi X 174 genome.

In certain aspects, the plurality of arrays are present in a flow cell having a plurality of channels. In certain aspects, each channel of the plurality of channels comprises a plurality of tiles. In some aspects, a tile comprises a complete array representing all or part of the genome of a single species or a single individual of a species. In other aspects, a tile comprises one or more nucleic acids representative of an organism or class or organisms. In certain aspects, the control nucleic acid is provided in multiple different tiles within a channel of the flow cell. In a preferred embodiment, a tile comprising the control nucleic acid includes only nucleic acids having a nucleotide sequence identical to or substantially identical to the control nucleotide sequence. In certain aspects, the control nucleic acid is provided in different channels of the flow cell.

Additional embodiments can be found in U.S. Provisional Patent Application No. 61/294,811 filed on Jan. 13, 2010 and Provisional Patent Application No. 61/321,029 filed on Apr. 5, 2010, the contents of which are incorporated herein by reference in their entireties.

DETAILED DESCRIPTION OF THE PREFERRED EMBODIMENT

Figure 1:
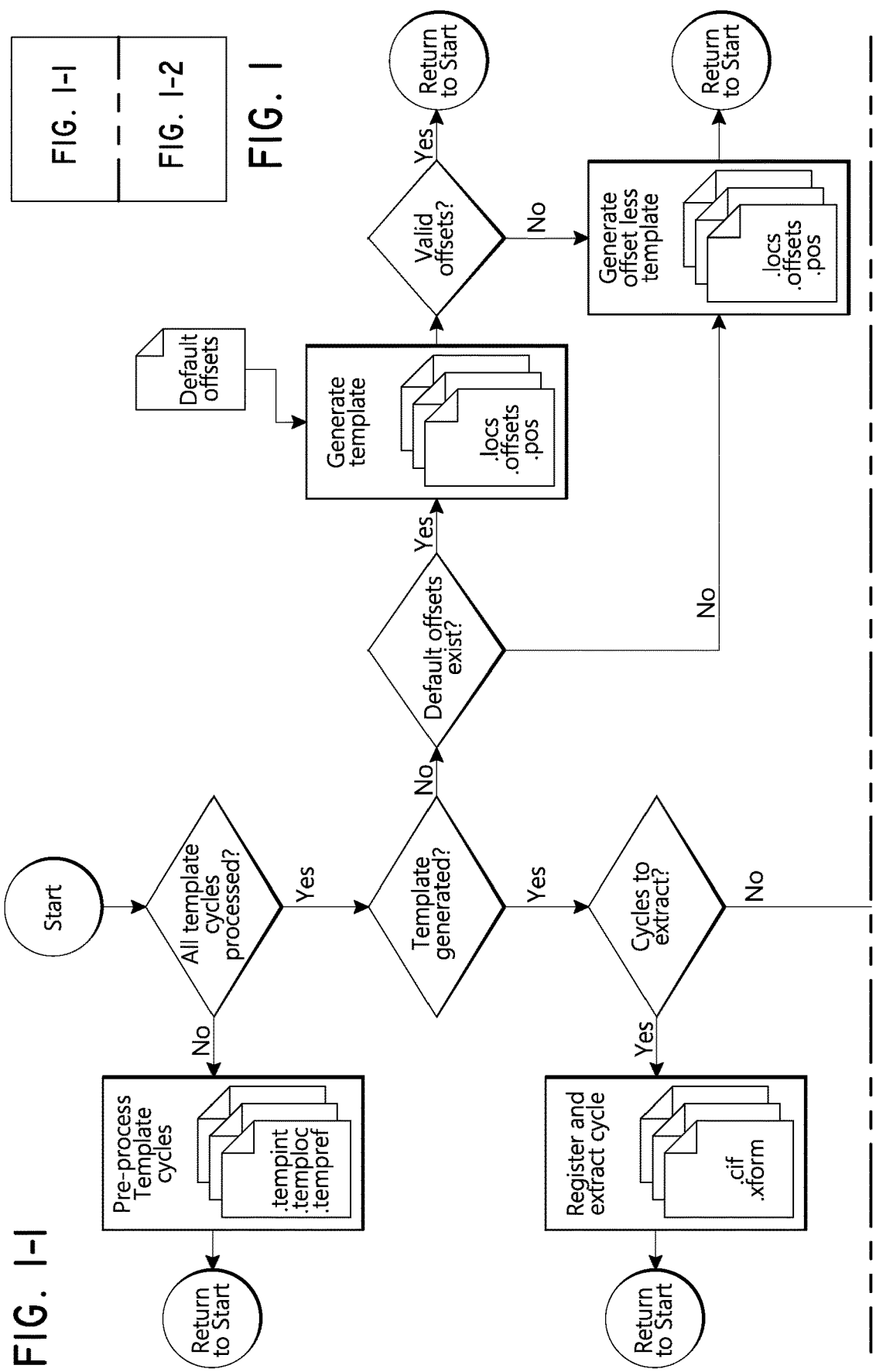
FIG. 1 is a schematic drawing demonstrating the general workflow in real time image analysis.
Figures 1, 2:
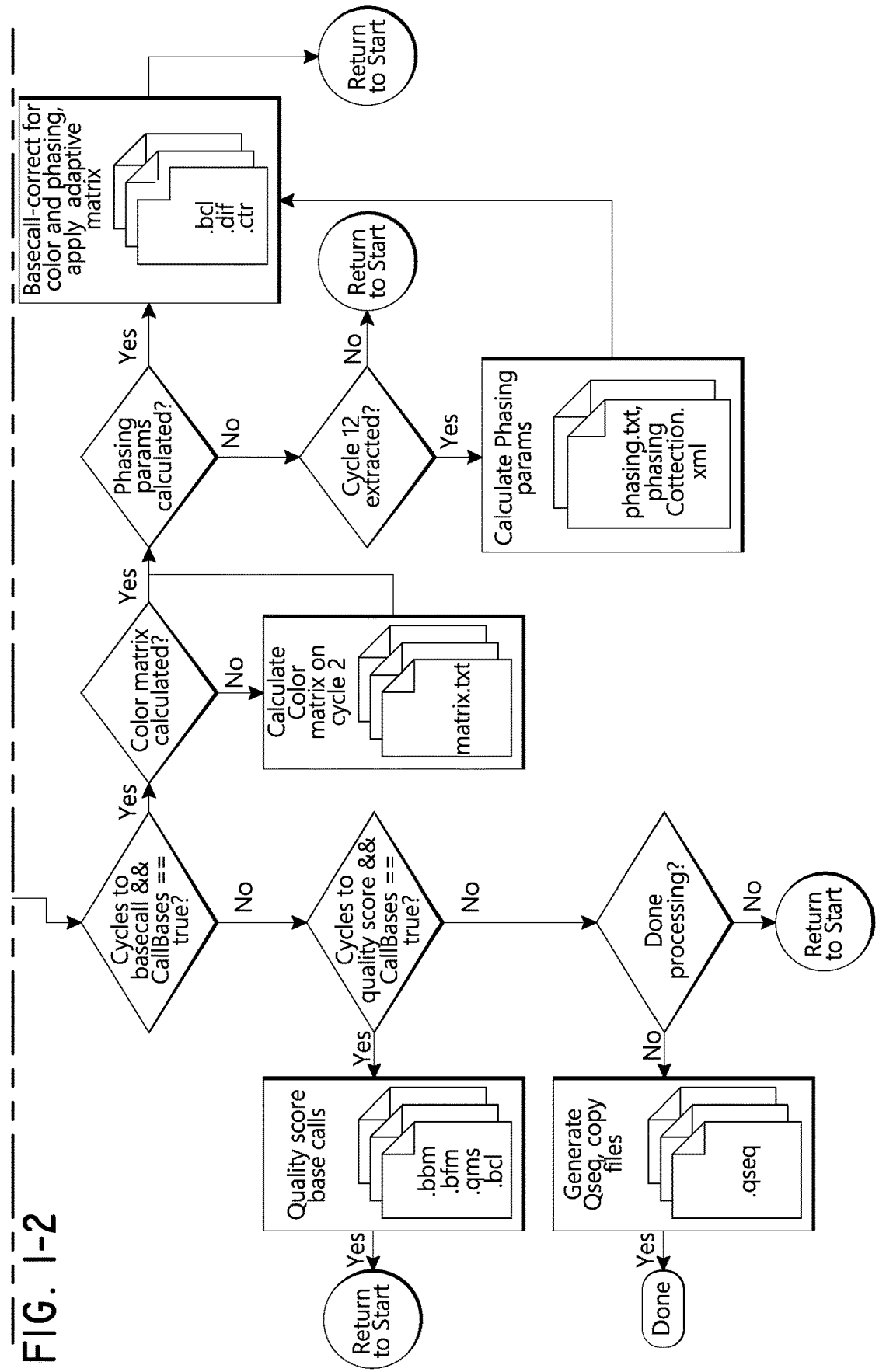

The analysis of image data presents a number of challenges, especially with respect to comparing images of an item or structure that are captured from different points of reference. Most image analysis methodology employs, at least in part, steps for aligning multiple separate images with respect to each other based on characteristics or elements present in both images. Various embodiments of the compositions and methods disclosed herein improve upon previous methods for image analysis.

Recently, tools have been developed that acquire and analyze image data generated at different time points or perspectives. Some examples include tools for analysis of satellite imagery and molecular biology tools for sequencing and characterizing the molecular identity of a specimen. In any such system, acquiring and storing large numbers of high-quality images typically requires massive amounts of storage capacity. Additionally, once acquired and stored, the analysis of image data can become resource intensive and can interfere with processing capacity of other functions, such as ongoing acquisition and storage of additional image data. As such, methods and systems which improve the speed and accuracy of analysis of the acquisition and analysis of image data would be beneficial.

In the molecular biology field, one of the processes for nucleic acid sequencing in use is sequencing-by-synthesis. The technique can be applied to massively parallel sequencing projects. For example, by using an automated platform, it is possible to carry out hundreds of thousands of sequencing reactions simultaneously. Thus, one of the embodiments of the present invention relates to instruments and methods for acquiring, storing, and analyzing image data generated during nucleic acid sequencing. Although the embodiments of the present invention are described in relation to nucleic acid sequencing, they are applicable in any field where image data acquired at different time points, spatial locations or other temporal or physical perspectives is analyzed. For example, the methods and systems described herein are useful in the fields of molecular and cell biology where image data from microarrays, biological specimens, cells, organisms and the like is acquired and at different time points or perspectives and analyzed. Images can be obtained using any number of techniques known in the art including, but not limited to, fluorescence microscopy, light microscopy, confocal microscopy, optical imaging, magnetic resonance imaging, tomography scanning or the like. As another example, the methods and systems described herein can be applied where image data obtained by surveillance, aerial or satellite imaging technologies and the like is acquired at different time points or perspectives and analyzed. The methods and systems are particularly useful for analyzing images obtained for a field of view in which the features being viewed remain in the same locations relative to each other in the field of view. The features may however have characteristics that differ in separate images, for example, the features may appear different in separate images of the field of view. For example, the features may appear different with regard to the color of a given feature detected in different images, a change in the intensity of signal detected for a given feature in different images, or even the appearance of a signal for a given feature in one image and disappearance of the signal for the feature in another image.

Enormous gains in the amount of data that can be acquired and stored make streamlined image analysis methods even more beneficial. For example, the image analysis methods described herein permit both designers and end users to make efficient use of existing computer hardware. Accordingly, presented herein are methods and systems which reduce the computational burden of processing data in the face of rapidly increasing data output. For example, in the field of DNA sequencing, yields have scaled 15-fold over the course of a recent year, and can now reach hundreds of gigabases in a single run of a DNA sequencing device. If computational infrastructure requirements grew proportionately, large genome-scale experiments would remain out of reach to most researchers. Thus, the generation of more raw sequence data will increase the need for secondary analysis and data storage, making optimization of data transport and storage extremely valuable. Some embodiments of the methods and systems presented herein can reduce the time, hardware, networking, and laboratory infrastructure requirements needed to produce usable sequence data.

Sequencing Methods

The methods described herein can be used in conjunction with a variety of nucleic acid sequencing techniques. Particularly applicable techniques are those wherein nucleic acids are attached at fixed locations in an array such that their relative positions do not change and wherein the array is repeatedly imaged. Embodiments in which images are obtained in different color channels, for example, coinciding with different labels used to distinguish one nucleotide base type from another are particularly applicable. In some embodiments, the process to determine the nucleotide sequence of a target nucleic acid can be an automated process. Preferred embodiments include sequencing-by-synthesis ("SBS") techniques.

SBS techniques generally involve the enzymatic extension of a nascent nucleic acid strand through the iterative addition of nucleotides against a template strand. In traditional methods of SBS, a single nucleotide monomer may be provided to a target nucleotide in the presence of a polymerase in each delivery. However, in the methods described herein, more than one type of nucleotide monomer can be provided to a target nucleic acid in the presence of a polymerase in a delivery.

SBS can utilize nucleotide monomers that have a terminator moiety or those that lack any terminator moieties. Methods utilizing nucleotide monomers lacking terminators include, for example, pyrosequencing and sequencing using γ-phosphate-labeled nucleotides, as set forth in further detail below. In methods using nucleotide monomers lacking terminators, the number of nucleotides added in each cycle is generally variable and dependent upon the template sequence and the mode of nucleotide delivery. For SBS techniques that utilize nucleotide monomers having a terminator moiety, the terminator can be effectively irreversible under the sequencing conditions used as is the case for traditional Sanger sequencing which utilizes dideoxynucleotides, or the terminator can be reversible as is the case for sequencing methods developed by Solexa (now Illumina, Inc.).

SBS techniques can utilize nucleotide monomers that have a label moiety or those that lack a label moiety. Accordingly, incorporation events can be detected based on a characteristic of the label, such as fluorescence of the label; a characteristic of the nucleotide monomer such as molecular weight or charge; a byproduct of incorporation of the nucleotide, such as release of pyrophosphate; or the like. In embodiments, where two or more different nucleotides are present in a sequencing reagent, the different nucleotides can be distinguishable from each other, or alternatively, the two or more different labels can be the indistinguishable under the detection techniques being used. For example, the different nucleotides present in a sequencing reagent can have different labels and they can be distinguished using appropriate optics as exemplified by the sequencing methods developed by Solexa (now Illumina, Inc.).

Preferred embodiments include pyrosequencing techniques. Pyrosequencing detects the release of inorganic pyrophosphate (PPi) as particular nucleotides are incorporated into the nascent strand (Ronaghi, M., Karamohamed, S., Pettersson, B., Uhlen, M. and Nyren, P. (1996) "Real-time DNA sequencing using detection of pyrophosphate release." *Analytical Biochemistry* 242(1), 84-9; Ronaghi, M. (2001) "Pyrosequencing sheds light on DNA sequencing." *Genome Res.* 11(1), 3-11; Ronaghi, M., Uhlen, M. and Nyren, P. (1998) "A sequencing method based on real-time pyrophosphate." *Science* 281(5375), 363; U.S. Pat. Nos. 6,210,891; 6,258,568 and 6,274,320, the disclosures of which are incorporated herein by reference in their entireties). In pyrosequencing, released PPi can be detected by being immediately converted to adenosine triphosphate (ATP) by ATP sulfurylase, and the level of ATP generated is detected via luciferase-produced photons. The nucleic acids to be sequenced can be attached to features in an array and the array can be imaged to capture the chemiluminescent signals that are produced due to incorporation of a nucleotides at the features of the array. An image can be obtained after the array is treated with a particular nucleotide type (e.g. A, T, C or G). Images obtained after addition of each nucleotide type will differ with regard to which features in the array are detected. These differences in the image reflect the different sequence content of the features on the array. However, the relative locations of each feature will remain unchanged in the images. The images can be stored, processed and analyzed using the methods set forth herein. For example, images obtained after treatment of the array with each different nucleotide type can be handled in the same way as exemplified herein for images obtained from different detection channels for reversible terminator-based sequencing methods.

In another exemplary type of SBS, cycle sequencing is accomplished by stepwise addition of reversible terminator nucleotides containing, for example, a cleavable or photobleachable dye label as described, for example, in WO 04/018497 and U.S. Pat. No. 7,057,026, the disclosures of which are incorporated herein by reference. This approach is being commercialized by Solexa (now Illumina Inc.), and is also described in WO 91/06678 and WO 07/123744, each of which is incorporated herein by reference. The availability of fluorescently-labeled terminators in which both the termination can be reversed and the fluorescent label cleaved facilitates efficient cyclic reversible termination (CRT) sequencing. Polymerases can also be co-engineered to efficiently incorporate and extend from these modified nucleotides.

Preferably in reversible terminator-based sequencing embodiments, the labels do not substantially inhibit extension under SBS reaction conditions. However, the detection labels can be removable, for example, by cleavage or degradation. Images can be captured following incorporation of labels into arrayed nucleic acid features. In particular embodiments, each cycle involves simultaneous delivery of four different nucleotide types to the array and each nucleotide type has a spectrally distinct label. Four images can then be obtained, each using a detection channel that is selective for one of the four different labels. Alternatively, different nucleotide types can be added sequentially and an image of the array can be obtained between each addition step. In such embodiments each image will show nucleic acid features that have incorporated nucleotides of a particular type. Different features will be present or absent in the different images due the different sequence content of each feature. However, the relative position of the features will remain unchanged in the images. Images obtained from such reversible terminator-SBS methods can be stored, processed and analyzed as set forth herein. Following the image capture step, labels can be removed and reversible terminator moieties can be removed for subsequent cycles of nucleotide addition and detection. Removal of the labels after they have been detected in a particular cycle and prior to a subsequent cycle can provide the advantage of reducing background signal and crosstalk between cycles. Examples of useful labels and removal methods are set forth below.

In particular embodiments some or all of the nucleotide monomers can include reversible terminators. In such embodiments, reversible terminators/cleavable fluors can include fluor linked to the ribose moiety via a 3' ester linkage (Metzker, Genome Res. 15:1767-1776 (2005), which is incorporated herein by reference). Other approaches have separated the terminator chemistry from the cleavage of the fluorescence label (Ruparel et al., Proc Natl Acad Sci USA 102: 5932-7 (2005), which is incorporated herein by reference in its entirety). Ruparel et al described the development of reversible terminators that used a small 3' allyl group to block extension, but could easily be deblocked by a short treatment with a palladium catalyst. The fluorophore was attached to the base via a photocleavable linker that could easily be cleaved by a 30 second exposure to long wavelength UV light. Thus, either disulfide reduction or photocleavage can be used as a cleavable linker. Another approach to reversible termination is the use of natural termination that ensues after placement of a bulky dye on a dNTP. The presence of a charged bulky dye on the dNTP can act as an effective terminator through steric and/or electrostatic hindrance. The presence of one incorporation event prevents further incorporations unless the dye is removed. Cleavage of the dye removes the fluor and effectively reverses the termination. Examples of modified nucleotides are also described in U.S. Pat. Nos. 7,427,673, and 7,057,026, the disclosures of which are incorporated herein by reference in their entireties.

Additional exemplary SBS systems and methods which can be utilized with the methods and systems described herein are described in U.S. Patent Application Publication No. 2007/0166705, U.S. Patent Application Publication No. 2006/0188901, U.S. Pat. No. 7,057,026, U.S. Patent Application Publication No. 2006/0240439, U.S. Patent Application Publication No. 2006/0281109, PCT Publication No. WO 05/065814, U.S. Patent Application Publication No. 2005/0100900, PCT Publication No. WO 06/064199 and PCT Publication No. WO 07/010251, the disclosures of which are incorporated herein by reference in their entireties.

Some embodiments can utilize sequencing by ligation techniques. Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. As with other SBS methods, images can be obtained following treatment of an array of nucleic acid features with the labeled sequencing reagents. Each image will show nucleic acid features that have incorporated labels of a particular type. Different features will be present or absent in the different images due the different sequence content of each feature, but the relative position of the features will remain unchanged in the images. Images obtained from ligation-based sequencing methods can be stored, processed and analyzed as set forth herein. Exemplary SBS systems and methods which can be utilized with the methods and systems described herein are described in U.S. Pat. Nos. 6,969,488, 6,172,218, and 6,306,597, the disclosures of which are incorporated herein by reference in their entireties.

Some embodiments can utilize nanopore sequencing (Deamer, D. W. & Akeson, M. "Nanopores and nucleic acids: prospects for ultrarapid sequencing." Trends Biotechnol. 18, 147-151 (2000); Deamer, D. and D. Branton, "Characterization of nucleic acids by nanopore analysis". Acc. Chem. Res. 35:817-825 (2002); Li, J., M. Gershow, D. Stein, E. Brandin, and J. A. Golovchenko, "DNA molecules and configurations in a solid-state nanopore microscope" Nat. Mater. 2:611-615 (2003), the disclosures of which are incorporated herein by reference in their entireties). In such embodiments, the target nucleic acid passes through a nanopore. The nanopore can be a synthetic pore or biological membrane protein, such as α-hemolysin. As the target nucleic acid passes through the nanopore, each base-pair can be identified by measuring fluctuations in the electrical conductance of the pore. (U.S. Pat. No. 7,001,792; Soni, G. V. & Meller, "A. Progress toward ultrafast DNA sequencing using solid-state nanopores." Clin. Chem. 53, 1996-2001 (2007); Healy, K. "Nanopore-based single-molecule DNA analysis." Nanomed. 2, 459-481 (2007); Cockroft, S. L., Chu, J., Amorin, M. & Ghadiri, M. R. "A single-molecule nanopore device detects DNA polymerase activity with single-nucleotide resolution." J. Am. Chem. Soc. 130, 818-820 (2008), the disclosures of which are incorporated herein by reference in their entireties). Data obtained from nanopore sequencing can be stored, processed and analyzed as set forth herein. In particular, the data can be treated as an image in accordance with the exemplary treatment of optical images and other images that is set forth herein.

Some embodiments can utilize methods involving the real-time monitoring of DNA polymerase activity. Nucleotide incorporations can be detected through fluorescence resonance energy transfer (FRET) interactions between a fluorophore-bearing polymerase and γ-phosphate-labeled nucleotides as described, for example, in U.S. Pat. Nos. 7,329,492 and 7,211,414 (each of which is incorporated herein by reference) or nucleotide incorporations can be detected with zero-mode waveguides as described, for example, in U.S. Pat. No. 7,315,019 (which is incorporated herein by reference) and using fluorescent nucleotide analogs and engineered polymerases as described, for example, in U.S. Pat. No. 7,405,281 and U.S. Patent Application Publication No. 2008/0108082 (each of which is incorporated herein by reference). The illumination can be restricted to a zeptoliter-scale volume around a surface-tethered polymerase such that incorporation of fluorescently labeled nucleotides can be observed with low background (Levene, M. J. et al. "Zero-mode waveguides for single-molecule analysis at high concentrations." Science 299, 682-686 (2003); Lundquist, P. M. et al. "Parallel confocal detection of single molecules in real time." Opt. Lett. 33, 1026-1028 (2008); Korlach, J. et al. "Selective aluminum passivation for targeted immobilization of single DNA polymerase molecules in zero-mode waveguide nanostructures." Proc. Natl. Acad. Sci. USA 105, 1176-1181 (2008), the disclosures of which are incorporated herein by reference in their entireties). Images obtained from such methods can be stored, processed and analyzed as set forth herein.

The above SBS methods can be advantageously carried out in multiplex formats such that multiple different target nucleic acids are manipulated simultaneously. In particular embodiments, different target nucleic acids can be treated in a common reaction vessel or on a surface of a particular substrate. This allows convenient delivery of sequencing reagents, removal of unreacted reagents and detection of incorporation events in a multiplex manner. In embodiments using surface-bound target nucleic acids, the target nucleic acids can be in an array format. In an array format, the target nucleic acids can be typically bound to a surface in a spatially distinguishable manner. The target nucleic acids can be bound by direct covalent attachment, attachment to a bead or other particle or binding to a polymerase or other molecule that is attached to the surface. The array can include a single copy of a target nucleic acid at each site (also referred to as a feature) or multiple copies having the same sequence can be present at each site or feature. Multiple copies can be produced by amplification methods such as, bridge amplification or emulsion PCR as described in further detail below.

The methods set forth herein can use arrays having features at any of a variety of densities including, for example, at least about 10 features/cm$^2$, 100 features/cm$^2$, 500 features/cm$^2$, 1,000 features/cm$^2$, 5,000 features/cm$^2$, 10,000 features/cm$^2$, 50,000 features/cm$^2$, 100,000 features/cm$^2$, 1,000,000 features/cm$^2$, 5,000,000 features/cm$^2$, or higher.

It will be appreciated that any of the above-described sequencing processes can be incorporated into the methods and/or systems described herein. Furthermore, it will be appreciated that other known sequencing processes can be easily by implemented for use with the methods and/or systems described herein. It will also be appreciated that the methods and systems described herein are designed to be applicable with any nucleic acid sequencing technology. Additionally, it will be appreciated that the methods and systems described herein have even wider applicability to any field where tracking and analysis of features in a specimen over time or from different perspectives is important. For example, the methods and systems described herein can be applied where image data obtained by surveillance, aerial or satellite imaging technologies and the like is acquired at different time points or perspectives and analyzed.

Processing: Image Acquisition and Analysis in Real Time

In accordance with the above, provided herein are methods of performing image analysis which allow image analysis to occur while acquiring and/or storing large amounts of image data. The methods can include performing image analysis in the background of a process that preferentially acquires and/or stores image data. Such methods can be performed by a single processor capable of time-division multiplexing or other multithreading process. Accordingly, image analysis can be performed using widely available single processor machines to both acquire and/or store large amounts of image data using one process thread while performing image analysis using another thread. In preferred embodiments, the acquisition and/or storage thread takes precedence over the analysis thread. In such embodiments, the image analysis instructions or image analysis program monitors the file creation and/or write activity taking place during the image acquisition and/or storage process. When data acquisition and/or storage is not occurring, the processor is permitted to execute a set of image analysis instructions or an image analysis program. This can allow for a reduction in the total amount of data ultimately exported for storage or downstream analysis. In other embodiments, such methods are implemented using multiple processes that may or may not overlap temporally, for example, by utilizing two or more separate processors.

In particular embodiments, the methods and systems set forth herein provide the advantage of reducing the amount of data to a more manageable level from the amount of data present in raw images. For example, the methods and systems can provide at least a 2-fold, at least a 10-fold, at least a 25-fold, at least a 50-fold or at least a 100-fold reduction in data size when comparing data content of images to data indicative of a detectable characteristic of the images. An example is the reduction in data in going from images of an array of nucleic acids that are being sequenced to data indicating the identity of a DNA sequence for nucleic acids in the array (e.g. sequence of base calls).

In certain aspects, the methods can include the steps of providing a first data set to store on a storage device; providing a second data set for analysis; processing the first data set and the second data set; wherein the processing comprises acquiring and/or storing the first data set on the storage device and analyzing the second data set when the processor is not acquiring and/or storing the first data set. In certain aspects, the processing step includes identifying at least one instance of a conflict between acquiring and/or storing the first data set and analyzing the second data set; and resolving the conflict in favor of acquiring and/or storing image data such that acquiring and/or storing the first data set is given priority.

As used herein, the terms storage, storage device, storage capacity and the like can refer to any medium, device or means of storage of information. Storage can include, but is not limited to, a disk drive device such as a hard drive, floppy disk, optical or magneto-optical disk, memory such as RAM or ROM chips, and any other medium used to record or store data. In some embodiments, a storage capacity is connected to a processor which sends information to be recorded on the storage capacity after it is acquired. In specific embodiments, image data is acquired by a system and is recorded on a storage capacity. In other embodiments, image data is acquired by a system and information is first extracted from the image data, and the extracted information is recorded on a storage capacity.

As used herein, analysis can refer to any manipulations performed on data. In some embodiments, analysis is performed on raw image data. In other embodiments, analysis is performed on data that has been processed to some degree. In certain embodiments, analysis can include organizing, aligning and ordering a set of image files or data extracted from images files. Thus, analysis can include, but is not limited to, the pre-processing of images from a subset of images, tracking the location of features of a specimen across a set of images of the specimen captured at different reference points, generation of templates, registration of signal and data to a template, extraction of signal data from an image, generation of offset data, calculating a color matrix for signals in image data, calculation of phasing parameters, assigning colors to features in an image, correcting the assignment of colors due to issues such as channel cross-talk and phasing, calculating quality scores for each color assignment, generating output files, and the like.

In preferred embodiments of the image analysis methods and systems presented herein, image data for nucleic acid sequencing applications is acquired and analyzed. For example, FIG. 1 describes the general flow of operations that can be performed during the acquisition and analysis of DNA sequencing image data.

As used herein, "acquiring", "acquisition" and like terms refer to any part of the process of obtaining an image file. In some embodiments, data acquisition can include generating an image of a specimen, looking for a signal in a specimen, instructing a detection device to look for or generate an image of a signal, giving instructions for further analysis or transformation of an image file, and any number of transformations or manipulations of an image file.

As used herein, "image" refers to a reproduction or representation of at least a portion of a specimen or other object. In some embodiments, the reproduction is an optical reproduction, for example, produced by a camera or other optical detector. The reproduction can be a non-optical reproduction, for example, a representation of electrical signals obtained from an array of nanopore features or a representation of electrical signals obtained from an ion-sensitive CMOS detector. In particular embodiments non-optical reproductions can be excluded from a method or apparatus set forth herein. An image can have a resolution capable of distinguishing features of a specimen that are present at any of a variety of spacings including, for example, those that are separated by less than 100 μm, 50 μm, 10 μm, 5 μm, 1 μm or 0.5 μm.

In preferred embodiments, the methods provided herein can include determining whether a processor is actively acquiring data or whether the processor is in a low activity state. Acquiring and storing large numbers of high-quality images typically requires massive amounts of storage capacity. Additionally, once acquired and stored, the analysis of image data can become resource intensive and can interfere with processing capacity of other functions, such as ongoing acquisition and storage of additional image data. Accordingly, as used herein, the term low activity state refers to the processing capacity of a processor at a given time. In some embodiments, a low activity state occurs when a processor is not acquiring and/or storing data. In some embodiments, a low activity state occurs when some data acquisition and/or storage is taking place, but additional processing capacity remains such that image analysis can occur at the same time without interfering with other functions.

As used herein, "identifying a conflict" refers to identifying a situation where multiple processes compete for resources. In some such embodiments, one process is given priority over another process. In some embodiments, a conflict may relate to the need to give priority for allocation of time, processing capacity, storage capacity or any other resource for which priority is given. Thus, in some embodiments, where processing time or capacity is to be distributed between two processes such as either analyzing a data set and acquiring and/or storing the data set, a conflict between the two processes exists and can be resolved by giving priority to one of the processes.

Also provided herein are systems for performing image analysis. The systems can include a processor; a storage capacity; and a program for image analysis, the program comprising instructions for processing a first data set for storage and the second data set for analysis, wherein the processing comprises acquiring and/or storing the first data set on the storage device and analyzing the second data set when the processor is not acquiring the first data set. In certain aspects, the program includes instructions for identifying at least one instance of a conflict between acquiring and/or storing the first data set and analyzing the second data set; and resolving the conflict in favor of acquiring and/or storing image data such that acquiring and/or storing the first data set is given priority. In certain aspects, the first data set comprises image files obtained from an optical imaging device. In certain aspects, the system further comprises an optical imaging device. In some aspects, the optical imaging device comprises a light source and a detection device.

As used herein, the term "program" refers to instructions or commands to perform a task or process. The term "program" can be used interchangeably with the term module. In certain embodiments, a program can be a compilation of various instructions executed under the same set of commands. In other embodiments, a program can refer to a discrete batch or file.

Set forth below are some of the surprising effects of utilizing the methods and systems for performing image analysis set forth herein. In some sequencing embodiments, an important measure of a sequencing system's utility is its overall efficiency. For example, the amount of mappable data produced per day and the total cost of installing and running the instrument are important aspects of an economical sequencing solution. To reduce the time to generate mappable data and to increase the efficiency of the system, real-time base calling can be enabled on an instrument computer and can run in parallel with sequencing chemistry and imaging. This allows much of the data processing and analysis to be completed before the sequencing chemistry finishes. Additionally, it can reduce the storage required for intermediate data and limit the amount of data that needs to travel across the network.

While sequence output has increased, the data per run transferred from the systems provided herein to the network and to secondary analysis processing hardware has substantially decreased. By transforming data on the instrument computer (acquiring computer), network loads are dramatically reduced. Without these on-instrument, off-network data reduction techniques, the image output of a fleet of DNA sequencing instruments would cripple most networks. For example, if a lab chose to export image files, it could run no more than five instruments concurrently without saturating a standard gigabit connection to a single file system. Because of the advances in real time data analysis presented herein, huge aggregate sequence output can now be supported with conventional network and hardware configurations.

The widespread adoption of the high-throughput DNA sequencing instruments has been driven in part by ease of use, support for a range of applications, and suitability for virtually any lab environment. The highly efficient algorithms presented herein allow significant analysis functionality to be added to a simple workstation that can control sequencing instruments. This reduction in the requirements for computational hardware has several practical benefits that will become even more important as sequencing output levels continue to increase. For example, by performing image analysis and base calling on a simple tower, heat production, laboratory footprint, and power consumption are kept to a minimum. In contrast, other commercial sequencing technologies have recently ramped up their computing infrastructure for primary analysis, with up to five times more processing power, leading to commensurate increases in heat output and power consumption. Thus, in some embodiments, the computational efficiency of the methods and systems provided herein enables customers to increase their sequencing throughput while keeping server hardware expenses to a minimum.

Accordingly, in some embodiments, the methods and/or systems presented herein act as a state machine, keeping track of the individual state of each specimen, and when it detects that a specimen is ready to advance to the next state, it does the appropriate processing and advances the specimen to that state. A more detailed example of how the state machine monitors a file system to determine when a specimen is ready to advance to the next state according to a preferred embodiment is set forth in Example 1 below.

In preferred embodiments, the methods and systems provided herein are multi-threaded and can work with a configurable number of threads. Thus, for example in the context of nucleic acid sequencing, the methods and systems provided herein are capable of working in the background during a live sequencing run for real-time analysis, or it can be run using a pre-existing set of image data for off-line analysis. In certain preferred embodiments, the methods and systems handle multi-threading by giving each thread its own subset of specimen for which it is responsible. This minimizes the possibility of thread contention.

In preferred embodiments of the methods and systems described herein the file configuration is preserved on shut down. In such embodiments, upon system start up, the system will automatically advance each tile's state to the latest possible state, based on which files exist on the file system. Example 1 below describes one embodiment of this process. In this way, the method or system can be interrupted or shut down and then restarted without affecting processing. For example, if the method or system starts up and detects that a specimen already has a template file, and already has an intensity files for the first five cycles, then it can advance the specimen to the "Waiting to Extract Cycle 6" state.

Template Generation

Also provided herein are methods of for template generation. Template generation can be viewed as two processes: signal finding and signal selection. The two processes are discussed below.

Signal Finding.

Provided herein are methods of tracking the location of features of a specimen across a set of images of the specimen captured at different reference points. These methods can be utilized in a process referred to herein as template generation. The methods can comprise the steps of: (a) selecting a subset of images, wherein the images of the subset depict signals corresponding to features of the specimen, and wherein the images of the subset are captured at different reference points; (b) selecting a primary image from the subset of images; and (c) registering the signals depicted in the images of the subset of images with the signals depicted in the primary image, so as to determine the location of the signals depicted in the images with respect to each other, thereby producing signal clumps; (d) selecting a signal from each of the signal clumps, thereby forming a template that permits the identification of the locations of features of the specimen; and (e) registering remaining images in the set of images with the template.

In particular situations there may be a problem of tracking the locations of features of a specimen in different color images taken at different cycles when the location of each feature in the specimen is fixed at the different cycles and the color of each feature in the specimen is changed at the different cycles. The methods and systems set forth herein can provide a solution in which a primary image (for example from a cycle referred to as golden cycle) is selected from among a set of images (for example images from several initial cycles) and features are registered from the set of images to the location of features in the primary image to form a registration file, wherein the registration file is used to register images from later cycles.

As used herein, the term "template" refers to a representation of the location or relation between signals or features. Thus, in some embodiments, a template is a physical grid with a representation of signals corresponding to features in a specimen. In some embodiments, a template can be a chart, table, text file or other computer file indicative of locations corresponding to features. In embodiments presented herein, a template is generated in order to track the location of features of a specimen across a set of images of the specimen captured at different reference points. For example, a template could be a set of x,y coordinates or a set of values that describe the direction and/or distance of one feature with respect to another feature.

As used herein, the term "specimen" can refer to an object or area of an object of which an image is captured. For example, in embodiments where images are taken of the surface of the earth, a parcel of land can be a specimen. In other embodiments where the analysis of biological molecules is performed in a flow cell, the flow cell may be divided into any number of subdivisions, each of which may be a specimen. For example, a flow cell may be divided into various flow channels or lanes, and each lane can be further divided into 2, 3, 4, 5, 6, 7, 8, 9, 10, 20, 30, 40, 50, 60 70, 80, 90, 100, 110, 120, 140, 160, 180, 200, 400, 600, 800, 1000 or more separate regions that are imaged. One example of a flow cell has 8 lanes, with each lane divided into 120 specimens or tiles. In another embodiment, a specimen may be made up of a plurality of tiles or even an entire flow cell. Thus, the image of each specimen can represent a region of a larger surface that is imaged.

It will be appreciated that references to ranges and sequential number lists described herein include not only the enumerated number but all real numbers between the enumerated numbers.

As used herein, a "feature" is an area of interest within a specimen or field of view. When used in connection with microarray devices or other molecular analytical devices, a feature refers to the area occupied by similar or identical molecules. For example, a feature can be an amplified oligonucleotide or any other group of a polynucleotide or polypeptide with a same or similar sequence. In other embodiments, a feature can be any element or group of elements that occupy a physical area on a specimen. For example, a feature could be a parcel of land, a body of water or the like. When a feature is imaged, each feature will have some area. Thus, in many embodiments, a feature is not merely one pixel.

The distances between features can be described in any number of ways. In some embodiments, the distances between features can be described from the center of one feature to the center of another feature. In other embodiments, the distances can be described from the edge of one feature to the edge of another feature, or between the outer-most identifiable points of each feature. The edge of a feature can be described as the theoretical or actual physical boundary on a chip, or some point inside the boundary of the feature. In other embodiments, the distances can be described in relation to a fixed point on the specimen or in the image of the specimen.

As used herein, a "reference point" refers to any temporal or physical distinction between images. In a preferred embodiment, a reference point is a time point. In a more preferred embodiment, a reference point is a time point or cycle during a sequencing reaction. However, the term "reference point" can include other aspects that distinguish or separate images, such as angle, rotational, temporal, or other aspects that can distinguish or separate images.

As used herein, a "subset of images" refers to a group of images within a set. For example, a subset may contain 1, 2, 3, 4, 6, 8, 10, 12, 14, 16, 18, 20, 30, 40, 50, 60 or any number of images selected from a set of images. In particular embodiments, a subset may contain no more than 1, 2, 3, 4, 6, 8, 10, 12, 14, 16, 18, 20, 30, 40, 50, 60 or any number of images selected from a set of images. In a preferred embodiment, images are obtained from one or more sequencing cycles with four images correlated to each cycle. Thus, for example, a subset could be a group of 16 images obtained through four cycles.

As used herein, a "signal" refers to a detectable event such as an emission, preferably light emission, for example, in an image. Thus, in preferred embodiments, a signal can represent any detectable light emission that is captured in an image (i.e., a "spot"). Thus, as used herein, "signal" can refer to both an actual emission from a feature of the specimen, and can refer to a spurious emission that does not correlate to an actual feature. Thus, a signal could arise from noise and could be later discarded as not representative of an actual feature of a specimen.

As used herein, the term "clump" refers to a group of signals. In particular embodiments, the signals are derived from different features. In a preferred embodiment, a signal clump is a group of signals that cluster together. In a more preferred embodiment, a signal clump represents a physical region covered by one amplified oligonucleotide. Each signal clump should be ideally observed as several signals (one per template cycle, and possibly more due to cross-talk). Accordingly, duplicate signals are detected where two (or more) signals are included in a template from the same clump of signals.

As used herein, terms such as "minimum," "maximum," "minimize," "maximize" and grammatical variants thereof can include values that are not the absolute maxima or minima. In some embodiments, the values include near maximum and near minimum values. In other embodiments, the values can include local maximum and/or local minimum values. In some embodiments, the values include only absolute maximum or minimum values.

As used herein, "cross-talk" refers to the detection of signals in one image that are also detected in a separate image. In a preferred embodiment, cross-talk can occur when an emitted signal is detected in two separate detection channels. For example, where an emitted signal occurs in one color, the emission spectrum of that signal may overlap with another emitted signal in another color. In a preferred embodiment, fluorescent molecules used to indicate the presence of nucleotide bases A, C, G and T are detected in separate channels. However, because the emission spectra of A and C overlap, some of the C color signal may be detected during detection using the A color channel. Accordingly, cross-talk between the A and C signals allows signals from one color image to appear in the other color image. In some embodiments, G and T cross-talk. In some embodiments, the amount of cross-talk between channels is asymmetric. It will be appreciated that the amount of cross-talk between channels can be controlled by, among other things, the selection of signal molecules having an appropriate emission spectrum as well as selection of the size and wavelength range of the detection channel.

As used herein, "register", "registering", "registration" and like terms refer to any process to correlate signals in an image or data set from a first time point or perspective with signals in an image or data set from another time point or perspective. For example, registration can be used to align signals from a set of images to form a template. In another example, registration can be used to align signals from other images to a template. One signal may be directly or indirectly registered to another signal. For example, a signal from image "S" may be registered to image "G" directly. As another example, a signal from image "N" may be directly registered to image "G", or alternatively, the signal from image "N" may be registered to image "S", which has previously been registered to image "G". Thus, the signal from image "N" is indirectly registered to image "G".

In some embodiments, acquired signal data is transformed using an affine transformation. In some such embodiments, template generation makes use of the fact that the affine transforms between color channels are consistent between runs. Because of this consistency, a set of default offsets can be used when determining the coordinates of the features in a specimen. For example, a default offsets file can contain the relative transformation (shift, scale, skew) for the different channels relative to one channel, such as the A channel. In other embodiments, however, the offsets between color channels drift during a run and/or between runs, making offset-driven template generation difficult. In such embodiments, the methods and systems provided herein can utilize offset-less template generation, which is described further below.

Figure 2A:
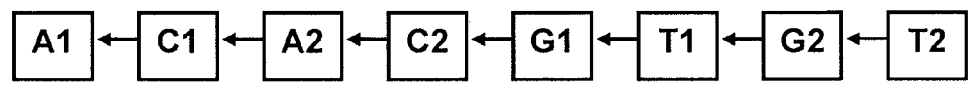
FIG. 2A is a schematic demonstrating a method of template generation.
Figure 2B:
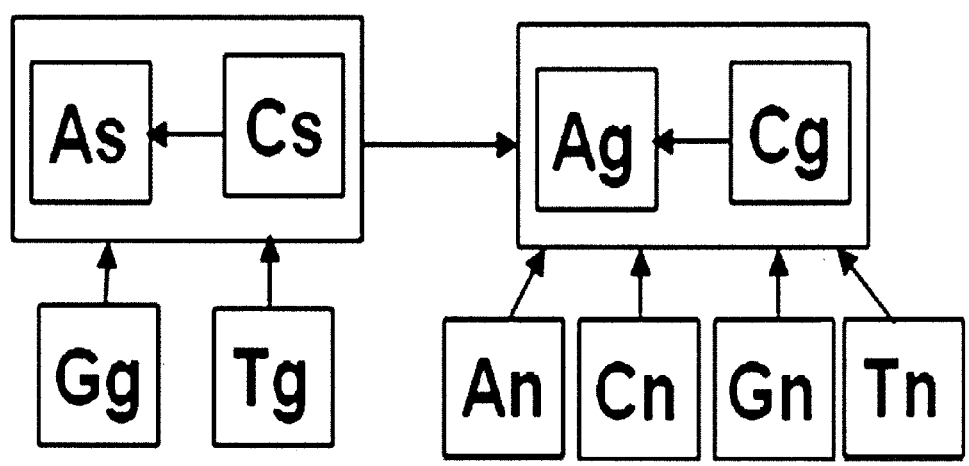
FIG. 2B is a schematic demonstrating a particularly robust method of template generation.

FIGS. 2A and 2B demonstrate direct and indirect registration during offset-less template generation. As set forth in FIG. 2A, the images from various images obtained from various cycles (e.g. images identified as A, C, T and G to represent the nucleotide type detected in the respective image) can be aligned and then merged. For example, offset-less template generation can proceed by first finding the signals in image A from cycle 1 ("A1"), using that as a reference and aligning it to the signals in image C from cycle 1 ("C1"), merging the signals to form a new template, then finding the signals in A2, aligning and merging, then C2, G1, T1, G2 and T2.

In practice, the offset-less template generation procedure set forth in FIG. 2A may not take into account various factors that can decrease the reliability of the resulting template. For example, sometimes the images from an initial cycle can be flawed due to focus failure of the optical imaging device. As such, in some embodiments, a different cycle is chosen as a frame of reference. In some cases, it is possible for cross-talk to occur between two channels, thus making it possible to register those two channels against each other in the same cycle. However, in general, registering an image against another image from the same cycle is not feasible because, for example, A1 may not register against T1 and G1 may not always register against T1. Thus, at each registration step, it is desirable to ensure that the fraction of shared spots is as high as possible.

Additionally, the offset-less template generation procedure set forth in FIG. 2A can result in other challenges. First, the master template can become very dense, particularly in a high-density image, making it more difficult to register later images against the master template. Second, the wrong cluster might be kept. Specifically, if two signal clumps are identified at nearly the same position, the one with high signal-to-noise is more likely to be real, and more likely to have correct coordinates. Thus, template generation can prefer high signal-to-noise clumps to low signal-to-noise clumps. However, in the exemplary procedure set forth in FIG. 2A, clumps from A1 are always kept, even if they are dominated by clumps in later cycles. Finally, the exemplary procedure of FIG. 2A does not deal well with shear seen in template cycles.

In view of the foregoing, an improved method of generating a template for image registration is provided herein, and an example is set forth in FIG. 2B. The method can comprise the steps of: (a) selecting a subset from a set of images of a specimen, the subset of images comprising a plurality of image cycles, wherein the images of the subset depict signals corresponding to features of the specimen, and wherein the images of the subset are captured at different reference points; (b) selecting a primary image from the subset of images, wherein the primary image is the image having the most signals from the subset of images; (c) selecting a secondary image from the subset of images, wherein the secondary image is the image having the second most signals from the subset of images; (d) registering the signals from the secondary image with the signals from the primary image; (e) registering signals from nonselected images with the signals from the secondary image, wherein the nonselected images are obtained from the image cycle from which the primary image was obtained; (f) registering signals from remaining images in the subset with signals from the primary image, so as to determine the location of the signals depicted in the images with respect to each other, thereby producing signal clumps; and (g) selecting a signal from each of the signal clumps, thereby forming a template that permits the identification of the locations of features of the specimen.

In contrast to template generation methods that register images against an image obtained from a pre-determined cycle, some of the template generation methods described herein perform a preliminary evaluation of several cycles of image data (images from a subset of images) in order to select the cycle image having the most signals from images of the image subset. The example shown in FIG. 2B sets forth the selection of a primary image.

As used herein, a "primary image" can refer to either a single image or a compilation of merged images. Thus, in preferred embodiments a primary image can be selected as a reference image upon which other images are registered.

According to the template generation method depicted in FIG. 2B, a primary image or "golden" cycle g is selected, which is the template with the most signals in A and C channels combined. In this example, the A and C channels are selected due to the cross talk that occurs between the channels. The signals from channel Cg are registered against Ag, and then Ag and Cg are merged to form a reference (A+C)g. A second or "silver" cycle s is selected which is the template with the second-most signals in the A and C channels combined. The signals from channel Cs are merged with the signals from As, and then the combined (A+C)s is registered against (A+C)g. Next, Gg and Tg are registered against (A+C)s, thus being indirectly registered to (A+C)g. Next, all other images (An, Cn, Gn, Tn) are registered against (A+C)g. Finally, the image lists are merged together at the end of the procedure, and signals with higher signal-to-noise values can be saved.

A more detailed example of template generation according to a preferred embodiment is set forth in Example 2 below. It will be understood that various labels and optical components can be used in accordance with the methods set forth herein such that cross talk may occur between channels other than those identified herein as the A and C channels. Accordingly, different images can be used in ways similar to those exemplified herein with regard to the A and C images.

Registration for Template Generation from Dense Images.

In some embodiments, clusters occur at a high density during a sequencing run. For example, in some embodiments, certain densities can approach or exceed 1,000,000 clusters/mm$^2$. The clusters in exemplary embodiments can be about 1 micometer in diameter. Accordingly, a majority of the surface can be occupied by clusters. As such, a majority of the space in an image of the surface can produce signals from clusters. Under certain conditions, template registration may fail at these higher densities. Accordingly, steps that can fail most often are registration of G and T virtual images against A and/or C virtual images from other cycles.

However, presented herein is the surprising finding that channels that do not cross-talk can be registered against each other in the same cycle. For example, in some embodiments, G and T channels can be registered against the A channel in the same cycle. Specifically, as discussed above, the cross-correlation between the C and A images allows registration of the C images against the A image, because when a C image is overlaid on the A image correctly, many of the clusters appear in both images. However, the cross-correlation between G and A (or T and A) differs because when G is overlaid on A correctly, clusters do not appear in both images. Furthermore, the cross-correlation for a correct registration is so low that it is a strong indicator of a signal. Thus, it has been advantageously found that an alternative method for registration can be implemented by determining the minimum or a low cross-correlation between channels which do not cross-talk in the same cycle (e.g., G+A, G+C, T+A, and/or T+C).

Accordingly, this surprising finding provides for marked improvements in registration of G and T images over a range of densities. For example, registration among non-cross-talking channels can occur over a range from about 10 clusters/mm$^2$, to about 1,000,000 clusters/mm$^2$. In typical embodiments, registration among non-crosstalking channels can occur over a range from about 100,000 clusters/mm$^2$ to about 1,000,000 clusters/mm$^2$. In such embodiments, the clusters can be any of a variety of shapes or sizes, for example, being roughly circular and having a diameter of about 1 micrometer. Registration among non-crosstalking channels can occur, for example, when at least about 25%, 50%, 60%, 70%, 80% or 90% of the space in a square millimeter of a surface or image thereof is occupied by clusters. Reference to an image here, as elsewhere in this disclosure, can include a composite image in which signals from multiple channels are present such that the image shows all or most of the clusters on the surface that was imaged.

Signal Selection.

As described above, template generation can be viewed as two processes: signal finding and signal selection. Signal finding is described above. Signal selection refers to a process of ordering signals, adding them to a template and discarding any signal which already has a template neighbor within a defined cluster radius. Accordingly, also provided herein are methods of selection of signals, also referred to elsewhere herein as spot selection. These include a method of selecting a signal from a cluster of signals in an image. The method can comprise the steps of: discarding any signals that do not appear within a cluster of signals, the cluster of signals having a defined cluster radius; and selecting the signal with the highest intensity of signals within a cluster. In certain aspects, the selecting step further comprises discarding any signal which already has a signal neighbor within the cluster radius.

In some embodiments, a cluster or clump of signals can comprise one or more signals or spots that correspond to a particular feature. When used in connection with microarray devices or other molecular analytical devices, a cluster can comprise one or more signals that together occupy the physical region occupied by an amplified oligonucleotide (or other polynucleotide or polypeptide with a same or similar sequence). For example, where a feature is an amplified oligonucleotide, a cluster can be the physical region covered by one amplified oligonucleotide. In other embodiments, a cluster or clump of signals need not strictly correspond to a feature. For example, spurious noise signals may be included in a signal cluster but not necessarily be within the feature area. In a preferred embodiment, a feature is observed as several signals, with one signal per template cycle, and possibly more due to cross-talk. For example, a cluster of signals from four cycles of a sequencing reaction would comprise at least four signals.

As used herein, the term "cluster radius" refers to a defined radius which encompasses a cluster of signals. Accordingly, by defining a cluster radius as larger or smaller, a greater number of signals can fall within the radius for subsequent ordering and selection. A cluster radius can be defined by any distance measure, such as pixels, meters, millimeters, or any other useful measure of distance.

In some embodiments, the selecting step further comprises ordering the signals. Signals can be ordered, for example, by detection count, by intensity or brightness relative to neighboring signals, by chastity, or by any other useful ordering mechanism that allows duplicate signals to be identified. In certain embodiments signals can be ordered first by detection count, then by intensity. In other embodiments, signals can be ordered first by intensity, then by detection count.

In a preferred embodiment, signals can be ordered by detection count. Detection count refers to the number of times where a signal was detected within a given radius of a defined position. The radius can be defined by any distance measure, such as pixels, meters, millimeters, or any other useful measure of distance. For example, in a preferred embodiment, detection count comprises the number of cycles where a signal was detected within a 0.1, 0.2, 0.3, 0.4, 0.5, 0.6, 0.7, 0.8, 0.9, 1.0, 1.5, 2.0, 2.5, 3.0, 4.0, 5.0, 6.0, 7.0, 8.0, 9.0, 10.0 or greater than 10.0 pixel radius. In a more preferred embodiment, the radius is 0.5 pixels; however, it will be appreciated that the radius may be larger or smaller depending on a variety of factors which include, but are not limited to, the quality of data acquisition and/or the end user's needs.

In another preferred embodiment, signals can be ordered according to intensity or brightness. The intensity or brightness of a signal can be defined relative to other signals, neighboring or background pixels, or by any other useful mechanism that allows for two or more signals to be ordered according to intensity or brightness. For example, in a preferred embodiment, the brightness of a signal can be defined as brightness relative to neighboring pixels, brightness relative to a noise estimate, absolute brightness, brightness as a percentile, or extracted (bilinear) brightness. In certain preferred embodiments, the brightness is calculated as the brightness relative to neighboring pixels. However, it will be apparent to one of skill in the art that other suitable methods of determining the brightness of a signal can be used for ordering signals.

In addition to the ordering mechanisms described above, it will be apparent that other suitable mechanisms can be used for ordering signals across multiple images. For example, the ordering mechanism can be the number of signals identified within a given radius. In certain embodiments, the radius can be a 0.1, 0.2, 0.3, 0.4, 0.5, 0.6, 0.7, 0.8, 0.9, 1.0, 1.5, 2.0, 2.5, 3.0, 4.0, 5.0, 6.0, 7.0, 8.0, 9.0, 10.0 or greater than a 10.0 pixel radius. The radius can be defined by any distance measure, such as pixels, meters, millimeters, or any other useful measure of distance. In other embodiments, the mechanism can be the distance to nearest neighbor, the distance to nearest neighbor from another cycle, or the distance to the nearest three neighbors.

One factor that can affect template generation is the overall density of features in a given specimen or image. In embodiments where the density is high, the defined cluster radius can be lowered in response to increased signal density. Accordingly, depending on the density of data in a specimen, the defined radius can be reduced. Where the radius is defined in pixels, the radius can be reduced to 2.0 pixels, 1.5 pixels, 1.0 pixel or less than 1.0 pixel.

A more detailed example of signal selection according to a preferred embodiment is set forth in Example 3 below.

Merging Signals Using Chastity Determination.

During template generation, signals (spots) can be identified on each image in each template cycle. Spots which correspond to the same cluster can be merged together. It will be appreciated that two separate issues can arise when merging spots. First, if two spots from the same cluster are not merged, duplicate reads of the same feature will result. Second, if spots from different clusters are merged together, which results in the loss of one of the spots, the template will omit features. This loss of features is especially prone to happen for small clusters. Advantageously, the determination of whether to merge or keep a spot can be markedly improved by determining the chastity of a spot (e.g., the intensity of the spot relative to a nearby spot) and using that chastity value in subsequent determinations.

Thus, some embodiments of the present disclosure relate to procedures for evaluating whether two spots should be merged. In certain embodiments, the procedure can comprise one or more of the following steps. 1) After generating a list of identified spots, intensities for each template cycle are extracted. 2) A cross-talk correction matrix is computed, and a preliminary base call is made for each spot. 3) The chastity of each base call is computed, as described below. 4) Spots with 2 or more chastity failures (where chastity is less than a threshold value, for example, less than 0.6) are omitted. 5) The sample diversity is determined, as is the probability that clusters will match base calls by chance. 6) The following analysis is performed in iteration for spots from highest to lowest chastity over template cycles. For each spot, if there is already a spot in the template within radius $r_1$, the spot is discarded. If there is already a spot in the template within radius $r_2$, and all reliable base calls (for example, chastity>0.7), the spot is discarded. In particular, if there are not high-chastity base calls, the spot is discarded. Otherwise, the spot is added to the template.

In the above embodiments, chastity can be calculated using the following exemplary method. Let A designate the maximum channel signal for a cluster in a cycle, and B designate the second highest signal. In the event that B is negative, 1−B is added to both A and B, to force non-negative values. Chastity is defined as A/(A+B). Using this definition, chastity ranges from a minimum of 0.5 to a maximum of 1. Higher-chastity calls are more likely to be correct. Thus, in some embodiments, clusters which have two or more base calls with chastity value less than a threshold value, for example less than 0.6 in the first 25 cycles are filtered.

In one example, two spots are considered as matching if, for each template cycle, (a) they have the same base call or (b) one or both spots have chastity<0.7. Further, the odds, M, that two randomly-selected spots will match are then computed as follows. Let n be the number of template cycles (typically 4 or 5). All strings of length n consisting of the bases A, C, G, T, N are indexed. For sequence i, let $p_i$ be the fraction of clusters with this sequence. Let $C_{ij}$ equal 1 if sequences i and j match, and 0 otherwise. Thus, $C_{ii}=1$ where all sequences are i. Then M is calculated:

$$M = \sum_{i,j} p_i p_j C_{ij}$$

In typical embodiments, M is below 1% for high-quality genomic data. M is higher when diversity is low or when data quality leads to low chastity.

Thus, based on the calculated value of M, clusters can be merged using chastity and base call information combined or chastity alone. Accordingly, in some embodiments where M is low (e.g., under about 20%), clusters are merged based on chastity and base calls combined. In some embodiments where M is high (e.g., greater than about 20%), clusters are merged based on chastity alone.

Registration and Intensity Extraction

As described above, the process of aligning the template of signal positions onto a given image is referred to as registration, and the process for determining an intensity value for each signal in the template for a given image is referred to as intensity extraction. For registration, the methods and systems provided herein take advantage of the random nature of signal clump positions by using image correlation to align the template to the image.

After a template has been generated using the methods described above, images can be registered to the template. Some of the basic steps involved in registration include loading the reference template for a given specimen and loading image files for one or more channels for a given imaging cycle. Then, for each image, an x,y shift can be identified. This can be done in any number of ways. In a preferred embodiment, an x,y shift is identified by correlating the location of a fixed point in the image with a fixed coordinate in the template. In a more preferred embodiment, the fixed point is one or more corners of the image, or one or more subregions near the corners of the image. The x,y shift information is then used to align the template and the image. This alignment can be performed using any suitable mechanism. In a preferred embodiment, the alignment uses a 6-parameter affine transformation that transforms the template positions into the image coordinates. In a more preferred embodiment, the 6-parameter affine transformation utilizes the x,y shift information for each of four subregions.

An intensity value for each signal in the template for a given image is then determined. In some embodiments, the intensity value is estimated using mechanisms that enhance signal to noise. For example, in a preferred embodiment, for each transformed cluster position, bilinear interpolation is used to estimate the intensity value of the cluster from a Laplacian pre-sharpened version of the image. The background can then be subtracted. In a preferred embodiment, the background is estimated from a region including and surrounding the cluster. For example, the region can be 32×32 pixels, or any suitably sized region surrounding and/or including the cluster itself. Estimates of background can be generated using any suitable method. In a preferred embodiment, estimates are generated based on the average of the dimmest four pixels in each region, and the subtraction interpolates between various regions to remove discontinuities in the estimate. However, it should be apparent to one of skill in the art that any suitable method of estimating background can be utilized.

Once background has been estimated and subtracted, the intensity values extracted across a specimen can be normalized to account for variance across a specimen. Thus, in a preferred embodiment, the intensity values for sub-tiles are normalized such that the $90^{th}$ percentile of their extracted intensities are equal. A sub-tile can be any suitable portion of a tile. For example, a tile can be divided using a grid format. The grid can be any suitable size that allows intensity values to be normalized. In a preferred embodiment, tiles are divided into a 4×4 grid of subtiles. Finally, intensity values are saved for future analysis and processing.

Color Matrix Estimation and Refinement

In certain embodiments, emission spectra overlap between different signals (i.e. "cross-talk"). For example, during sequencing by synthesis, the four dyes used in the sequencing process typically have some overlap in emission spectra. Thus, provided herein is a color matrix that corrects for this cross-talk. The terms color matrix, cross-talk matrix, and like terms as used herein refer to a matrix used to correct for the cross-talk between channels. For example, when a cluster emits a signal in the "C" channel, some of its light is also collected in the "A" channel. Thus, a color matrix corrects for this cross-talk, yielding the intensity generated from each of the four labeled nucleotides. The color matrix can also normalize the relative intensities collected for each of the four nucleotides.

In particular embodiments, a problem of assigning a color (for example, a base call) to different features in a set of images obtained for a cycle when cross talk occurs between different color channels and when the cross talk is different for different sets of images can be solved by making a preliminary color matrix for the features, making a preliminary color assignment (such as a base call) based on the color matrix, evaluating quality of the preliminary color assignment (such as a base call), and refining the preliminary color matrix based on the color assignment to form a refined color matrix.

Typically, the color matrix is computed using data from early cycles, and is applicable to all data subsequently generated during a sequencing run. However, as discussed in greater detail herein, the adaptive matrix procedure can re-adjust the color matrix to account for shifts in relative intensities from cycle to cycle or from tile to tile.

For example, in a preferred embodiment, color matrix estimation occurs after a tile has had its cycle 4 (fourth cycle) images registered and extracted. The estimation can, for example, follow the procedure described in "An estimate of the cross-talk matrix in four dye fluorescence-based DNA sequencing" by L. Li, T. P. Speed (Electrophoresis 1999 June; 20(7):1433-42, the content of which is hereby incorporated by reference in its entirety).

Color matrix, however, may change over various reference points, and thus a color matrix may not remain reliable throughout the entire process of image acquisition. As such, provided herein are methods and systems for assigning colors to features in an image, and for refining the assignment of colors. In some embodiments, the methods can comprise the steps of: (a) determining a preliminary color matrix for a feature; (b) evaluating quality of the preliminary color assignment; (c) refining the preliminary color matrix based on the color assignment, thereby forming a refined color matrix; and (d) making a final color assignment for a feature based on the refined color matrix. In certain aspects, the methods can further comprise the step of making a preliminary color assignment for a feature based on the preliminary color matrix, wherein the preliminary color assignment is made prior to step (b).

In certain aspects, the refined color matrix corrects for cross-talk between detection channels. In certain aspects, step (c) comprises re-orthogonalizing signal intensities for the preliminary color matrix at one or more features. In certain aspects, step (c) comprises re-normalizing signal intensities for the preliminary color matrix at one or more features. In certain aspects, step (c) comprising both re-orthogonalizing and re-normalizing signal intensities for the preliminary color matrix at one or more features.

The process of color matrix estimation can be performed using any suitable algorithm. In a preferred embodiment, the implemented algorithm can include one or more of the following. For a set of clusters, the scatter plot of objects in two colors is selected, and an axis is selected. The clusters are sorted into bins from the $70^{th}$ to the $90^{th}$ percentile of intensity along that axis. In the other channel, a line is fit through the $10^{th}$ percentile intensity of the clusters in each bin. The slope of this line is the matrix element between the two channels. This procedure can then be repeated for the other 11 combinations of intensities, thus filling the 4×4 matrix, where the diagonal elements are "1". The intensity distribution can be normalized by fitting a scale factor so that the Kolmogorov Smirnov distance between the different colors is minimized. This process minimizes the mismatch across all possible percentiles of the distribution. Alternatively, one could normalize to a specific percentile (e.g., the $90^{th}$ percentile). Then, for the final degree of freedom, enforce that the determinant of the color matrix is equal to 1.

The following is an illustration of how a color matrix can be utilized to correct for cross-talk between channels. Specifically, the color matrix, M, can allow for a computation of how much intensity is observed in a channel for an underlying signal. In this illustration, a given signal s has an observed intensity y. Thus, Ms=y. The matrix is used to recover the underlying signal: $s=M^{-1}y$. Thus, in a typical matrix for this illustration (shown in the table below), the largest cross-talk effects (shown in bold) are: 1) the A dye has significant cross-talk into the C channel, and 2) the G dye has significant cross-talk into the T channel.

| Intensity in Channel: | A | C | G | T |
|---|---|---|---|---|
| A | 1.4 | 0.3 | 0 | 0 |
| C | 0.9 | 0.9 | 0 | 0 |
| G | 0 | 0 | 1.3 | 0 |
| T | 0 | 0 | 0.8 | 0.9 |

Accordingly, for each pair of channels, the intensities in the two channels are converted to polar coordinates (r, θ). A radius-weighted histogram is computed of angles θ. The two local maxima in the histogram are identified, and these local maxima give approximate cross-talk coefficients:

Tan($\theta_1$)=C/A (observed C intensity divided by observed A intensity, for A nucleotide)

A Tan($\theta_1$)=C

Tan($\theta_1$) is the A-to-C cross-talk coefficient (row 2, column 1 of the matrix)

Tan(90−$\theta_2$)=A/C (observed A intensity divided by observed C intensity, of A nucleotide)

Tan(90−$\theta_2$) is the C-to-A cross-talk coefficient

To normalize channels, cross-talk is corrected using the initial matrix, and preliminary base calls are made. High-chastity base calls for each nucleotide are then identified. After or during base calling, a computation is made of the $10^{th}$, $20^{th}$, . . . to the $90^{th}$ percentiles of $A_1$, . . . , $A_9$ of the called A intensities. Similarly, a computation is made of the percentiles of $C_i$, $G_i$, $T_i$ of the called C, G and T intensities. With these computations in hand, a normalization factor for the C channel can be computed by scaling all percentages to match those of the A channel. The following formula shows the normalization factor for the C channel. Similar normalization factors are computed for the G and T channels.

$$NC = \frac{1}{9}\sum_{i=1}^{9} \frac{A_i}{C_i}$$

Finally, the overall matrix is scaled to a determinant=1. With this normalization of channels, it is possible to base call by identifying the channel with maximum corrected intensity.

In a preferred embodiment, after all tiles have had their color matrix estimated, the methods and system provided herein can compute a median matrix across all tiles. In preferred embodiments, this is the matrix that will be used during an entire sequencing run to generate the corrected intensities. The median is calculated element by element. However, if a control lane is specified, then the system may only use tiles from that lane for calculating the median matrix that will be used.

Phasing Estimation

A phasing estimation is an analytical tool for reducing noise during multiple cycles of a sequencing run. For example, in any given cycle of a sequencing run, one or more molecules may become "phased" at each cycle. As used herein, "phased", "phasing" and like terms refer to the situation where a molecule at a feature falls at least one base behind other molecules at the same feature as a result of the feature being sequenced at a particular cycle. As used herein, "pre-phased", "pre-phasing" and like terms refer to the situation where a molecule at a feature jumps at least one base ahead of other molecules at the same feature as a result of the feature being sequenced at a particular cycle.

The methods and systems provided herein can assume that a fixed fraction of molecules at each feature become phased and/or pre-phased at each cycle, in the sense that those molecules fall one base behind in sequencing. Thus, in a preferred embodiment, a phasing estimation is performed to adjust the observed intensities in a way that reduces the noise created by phased molecules. In a preferred embodiment, a phasing matrix is created to model phasing effects at any given cycle. This can be done, for example, by creating an N×N matrix where N is the total number of cycles. Then, to phase-correct intensities for a given cycle, the inverse of the phasing matrix is taken and the matrix row corresponding to the cycle is extracted. As a result, the vector of actual intensities for cycles 1 through N is the product of phasing matrix inverse and observed intensities for cycles 1 through N.

A more detailed example of a phasing estimation is set forth in Example 4 below.

Base Calling

Presented herein are methods and systems for identifying a nucleotide base in a nucleic acid sequence, or "base calling." Base calling refers to the process of determining a base call (A, C, G, T) for every feature of a given tile at a specific cycle. In order to base-call, intensities can first be corrected for channel cross-talk and for phasing and pre-phasing. The pre-phasing correction implies that base calling will typically lag intensity extraction, as knowledge of future cycles' intensities are required in order to correct for pre-phasing.

In order to perform base calling in many embodiments, the color matrix must already be estimated, the phasing and pre-phasing must be estimated, and the intensities for the next few cycles (actual number determined by the length of the phasing window) must exist. In addition, for such embodiments, base calling can take lower priority than registration and extraction. That is, base calling will not occur for a tile if it is possible to register and extract some subsequent cycle. The reason for this is to remove images from the local hard drive as quickly as possible, since these image files can fill up the local drive. The images are not needed after extraction and so can be deleted once extraction occurs.

In some embodiments, base calling can proceed as follows. The relevant intensity files for neighboring cycles (determined by the size of the phasing window) are loaded and color-corrected using the color matrix. Those values are then used to determine a phasing-corrected intensity vector for the current cycle. Each feature will receive a call based on the brightest phasing-corrected intensity for that feature. Once a preliminary base call has been made, the methods and systems provided herein can determine a refined color matrix for that feature, re-orthogonalize and re-normalize the intensities, and use the fully corrected intensities to make a final base call.

In view of the foregoing, provided herein are methods of identifying a nucleotide base in a nucleic acid sequence. The methods can comprise: determining the intensity of each differently colored signal present at a particular feature on an array at a particular time, wherein each differently colored signal corresponds to a different nucleotide base; repeating the determining step for a plurality of features on an array at the particular time; refining the signal intensity for the plurality of features then repeating the determining step for the plurality of features; and selecting for each feature of the plurality of features the refined signal having the highest intensity, wherein the signal having the highest intensity at a particular feature corresponds the identity of the nucleotide base present at the particular feature.

"Refining the signal intensity" refers to modifying the signal intensities for a plurality of features. In preferred embodiments, refining the signal intensity can include re-orthogonalizing or re-normalizing the signal intensities for the plurality of features. In a more preferred embodiment, refining the signal intensities can include both re-orthogonalizing and re-normalizing the signal intensities for the plurality of features.

Quality Scoring

Quality scoring refers to the process of assigning a quality score to each base call. Accordingly, presented herein are methods and systems for evaluating the quality of a base call from a sequencing read. In some embodiments, the methods can comprise the steps of: (a) calculating a set of predictor values for the base call; (b) using the predictor values to look up a quality score in a quality table.

The quality score can be presented in any suitable format that allows a user to determine the probability of error of any given base call. In some embodiments, the quality score is presented as a numerical value. For example, the quality score can be quoted as QXX where the XX is the score and it means that particular call has a probability of error of $10^{-XX/10}$. Thus, as an example, Q30 equates to an error rate of 1 in 1000, or 0.1% and Q40 equates to an error rate of 1 in 10,000 or 0.01%.

In some embodiments, the quality table is generated using Phred scoring on a calibration data set, the calibration set being representative of run and sequence variability. Phred scoring is described in greater detail in U.S. patent application Ser. No. 12/565,341 filed on Sep. 23, 2009 and entitled, "METHOD AND SYSTEM FOR DETERMINING THE ACCURACY OF DNA BASE IDENTIFICATIONS," the content of which is incorporated herein by reference in its entirety.

As stated above, quality scoring is performed by calculating a set of predictors for each base call, and using those predictor values to look up the quality score in a quality table. In some embodiments, the quality table is generated using a modification of the Phred algorithm on a calibration data set representative of run and sequence variability. The predictor values for each base call can be any suitable aspect that may indicate or predict the quality of the base call in a given sequencing run. For example, some predictors can include approximate homopolymer; intensity decay; penultimate chastity; signal overlap with background (SOWB); and shifted purity G adjustment.

As used herein, "approximate homopolymer" refers to a calculation of the number of consecutive identical base calls preceding a base call. In certain embodiments, the calculation can allow one exception, in order to identify problematic sequence contexts such as homopolymer runs and problematic motifs such as "GGCGG".

As used herein, "intensity decay" refers to the identification of base calls that suffer loss of signal as sequencing progresses. For example, this can be done by comparing the brightest intensity at the current cycle to the brightest intensity at cycle 1.

As used herein, "penultimate chastity" refers to measurement of early read quality in the first 25 bases based on the second worst chastity value. Chastity can be determined as the highest intensity value divided by the sum of the highest intensity value and the second highest intensity value, where the intensity values are obtained from four color channels.

As used herein, "signal overlap with background" (SOWB) refers to a measurement of the separation of the signal from the noise in previous and subsequent cycles. In a preferred embodiment, the measurement utilizes the 5 cycles immediately preceding and following the current cycle.

As used herein, "Shifted Purity G adjustment" refers to a measurement of the separation of the signal from the noise for the current base call only, while also accounting for G quenching effects. Due to an interaction between the dye and the DNA base incorporated in the previous cycle, the intensities in certain color channels may be decreased (quenched) in cycles following those cycles where a G nucleotide was incorporated. In some embodiments, the measurement of the separation of signal from noise is adjusted for G quenching by multiplying T channel intensity for a cycle following a G incorporation by 1.3, and by multiplying A channel intensity for a cycle following a G incorporation by 1.05.

After calculating quality scores, additional operations can be performed. Thus, in some embodiments, the method for evaluating the quality of a base call further comprises discounting unreliable quality scores at the end of each read. In preferred embodiments, the step of discounting unreliable quality scores comprises using an algorithm to identify a threshold of reliability. In a more preferred embodiment, reliable base calls comprise q-values above the threshold and unreliable base calls comprise q-values below the threshold. An algorithm for determining a threshold of reliability can comprise the End Anchored Maximal Scoring Segments (EAMSS) algorithm, for example. As used herein, an "EAMSS algorithm" is an algorithm that identifies transition points where good and reliable base calls (with mostly high q-values) become unreliable base calls (with mostly low q-values). The identification of such transition points can be done, for example, using a Hidden Markov Model that identifies shifts in the local distributions of quality scores. For example, a Hidden Markov Model can be used. Useful Hidden Markov Models are described, for example, in Lawrence R. Rabiner (February 1989). "A tutorial on Hidden Markov Models and selected applications in speech recognition". *Proceedings of the IEEE* 77 (2): 257-286. doi:10.1109/5.18626. However, it will be apparent to one of skill in the art that any suitable method of discounting unreliable quality scores may be employed. In a preferred embodiment, unreliable base calls can include base calls with a strong bias toward G base calls.

Another additional operation that can be performed includes identifying reads where the second worst chastity in the first 25 base calls is below a pre-established threshold, and marking the reads as poor quality data. This is referred to as read filtering. As discussed above, chastity can be determined as the highest intensity value divide by the sum of the highest intensity value and the second highest intensity value, where the intensity values are obtained from four color channels.

In some embodiments, because some of the above-described predictors utilize corrected intensities from future cycles, Quality Scoring will typically lag Base Calling. In a preferred embodiment, a tile is ready for Quality Scoring if a base call file exists for that cycle and if the corrected intensity files exist for the next few cycles (determined by the complexity of the predictors).

Real Time Metrics

The methods and systems provided herein can also utilize real-time metrics to display run quality to a user. Metrics can be displayed as graphs, charts, tables, pictures or any other suitable display method that provides a meaningful or useful representation of some aspect of run quality to a user. For example, real-time metrics displayed to a user can include a display of intensity values over the cycles of a run, the quality of the focus of optical equipment and cluster density in each lane. Additional metrics displays can include Q score, shown as a distribution based on the Q score, or as a heat map on a per cycle basis, for example. In some embodiments, real time metrics can include a summary table of various parameters, sorted by, for example, lane, tile, or cycle number. Image data from an entire tile or subregion of a tile may be displayed for a visual confirmation of image quality. Such image data may include close-up, thumbnail images of some or all parts of an image.

Additionally, some metrics displays can include the error rate on a per-cycle basis. The error rate can be calculated using a control nucleic acid, as described in greater detail below.

A more detailed example of various real-time metrics is set forth in Example 5 below.

Control Nucleic Acids

Also provided herein are methods for verifying that sequence data obtained from a plurality of arrays is non-artifactual. In molecular biology embodiments, the method can comprise incorporating a control nucleic acid into one or more arrays of the plurality of arrays and verifying that the control nucleic acid has been properly sequenced. In a preferred embodiment, the entire area of each of the one or more arrays comprises replicates of the control nucleic acid. In preferred embodiments, the control nucleic acid has a known sequence. It will be apparent to one of skill in the art that any known and stable sequence can be used as a control nucleic acid, so long as the sequence is sufficiently distinct from sequences of the target nucleic acid to be distinguished in the sequencing methods being employed. In preferred embodiments, the nucleic acid with a known sequence can be derived from an organism with a stable and non-variable genome. The control nucleic acid can thus be all or part of a genome from such an organism. In preferred embodiments, any suitable organism with a genome that is stable and non-variable can be used to generate a control nucleic acid. In a more preferred embodiment, the control nucleic acid is from a bacteriophage genome. For example, the bacteriophage Phi X 174 is known in the art to contain a stable and highly non-variable genome. However, it will be apparent that other suitable organisms, including but not limited to bacteriophage organisms, may be utilized to generate a control nucleic acid. As an alternative, the control nucleic acid can be a synthetic nucleic acid, preferably of a defined sequence that is known.

In some embodiments where a flow cell is used, the plurality of arrays are present in a flow cell having a plurality of fluid channels. In preferred embodiments, each fluid channel of the plurality of fluid channels comprises a plurality of tiles. Thus, for example the control nucleic acid can be provided in different tiles within a channel of the flow cell. Additionally, the control nucleic acid can be provided in one or more different fluid channels of the flow cell. In a preferred embodiment, the entire area of a tile comprises replicates of the control nucleic acid. In some such preferred embodiments, a plurality of such tiles are included in the flow cell.

Example 1

Real Time Analysis System

This example demonstrates how a Real Time Analysis (RTA) system performs processing and data analysis in the background of data acquisition during DNA sequencing run. At a basic level, the RTA can be classified as a state machine. In the exemplary methods shown in FIG. 1, the state machine monitors a file system to determine when a specimen is ready to advance to the next state. In this example, the conditions to advance the state for a specimen and subsequent actions to perform on that specimen are listed in the following table.

| Condition to advance state | Action to perform |
| --- | --- |
| Ready to pre-process Cycle 1 | Pre-process template cycles |
| Ready to Calculate Template | Calculate template (either using default offsets or generate offset-less template) |
| Ready to Register and Extract Cycle X | Register and extract cycle |
| Ready to Calculate Color Matrix | Calculate color matrix |
| Ready to Calculate Phasing | Calculate phasing parameters |
| Ready to Base Call Cycle X | Base call and correct for color and phasing, apply adaptive matrix |
| Ready to Quality Score Cycle X | Quality score base calls |

For example, a specimen will be ready to register and extract cycle 5 if: a) a template has been produced for that specimen and b) four image files (one TIF file for each channel) exist for that specimen for cycle 5.

The output of each processing step is a file, which is then used as a trigger for a subsequent processing step. For example, the output of the extraction step is a cluster intensity file (shown as ".cif" in FIG. 1), which can then be used as a trigger for the base calling step. The output of a base calling step is a base call file (shown as ".bcl" in FIG. 1), which is then used as a trigger for the quality scoring step. If a specimen is ready to advance in more than one state (e.g., ready to extract cycle 20, base call cycle 16 and quality score cycle 13), steps earlier in the data analysis process are given higher priority. In the hypothetical situation described above, extraction will take priority over base calling, and base calling will take priority over quality scoring.

In this example, the primary input required is one or more image files from a sequencing run. The state machine also can use default offsets (in the form of a DefaultOffsets file), for template generation. The DefaultOffsets file contains the relative transformation (shift, scale, skew) for the different channels relative to the A channel. If a DefaultOffsets file does not exist, the system will estimate the offsets from its first run and save the DefaultOffsets file. Also, the system will save a new DefaultOffsets file if it detects that there has been a change in the offsets (due to physical camera alignment or filter changes, for example).

The system can also read files which describe the details of the current run. In particular, the system looks in this file for: a) the name of the run, b) the number of cycles in the run, c) whether or not the run is paired end and d) which specimen (tiles) are being imaged for a read prep. In addition, the system can utilize a configuration file which is an xml file with key-value pairs for certain settings determined by the user and by the needs of the sequencing equipment.

Finally, the system can be called with command-line arguments. These arguments can include: Number of threads to use (defaults to 2); Copy Images flag (defaults to false); Call Bases (defaults to true); ShowGUI (defaults to true); Read Number; Number of cycles; Instrument name; Cycle Type (readPrep, read1, read2, read).

The primary output files produced by the system are QSEQ files. Each specimen that is analyzed will produce a QSEQ file that contains the base call and associated quality score for every cycle, every cluster. One QSEQ file is produced for each read in a paired-end run. The QSEQ files can then be used as input to alignment software, which aligns the reads to a reference genome. QSEQ files are typically text files.

Alternatively, the system can also output intensity and noise files, in the form of cluster intensity files and cluster noise files (cif and cnf). A single cif and cnf file is generated for every cycle for every tile. The CIF and CNF files can be used as input to sequence analysis software for off-line base calling.

Example 2

Template Generation: Signal Finding

This example demonstrates how template generation is performed during a DNA sequencing run in a flow channel having a plurality of closely-spaced, high-density microarrays. An initial step in the processing of image data from a sequencing instrument is the generation of templates for each array (tile). A template defines the positions of each feature (area of clonally amplified nucleic acid) in a tile, and is used as a reference for the subsequent registration and intensity extraction steps. In this example, the templates are defined in a coordinate system relative to the A image of the first cycle.

Template Generation

In this example, template generation utilized the first four cycles of image data. Once the last cycle for a tile was imaged, its template was generated. The basic steps in template generation were:

a) find spots in all 16 images (4 channels per cycle for 4 cycles), along with the intensity and noise value for each spot;

b) merge the spots from the 4 channels of each cycle using pre-defined offsets between channels in order to create a preliminary template. The intensity and noise values are used to give spots with higher signal-to-noise priority;

c) use the preliminary template from the cycle with the most signals (image spots) identified in channel A and C, and register spots from all other cycles to the template; and d) merge the spots from all images using the pre-defined offsets and the offsets determined from registration of the template cycles. Save the template as a locations file.

Pre-Processing

It was also beneficial to do whatever pre-processing possible for each template cycle as the images became available so as to minimize the processing time required during template generation. Towards that end, the following steps were performed for each template cycle:

i) Find spots in each of the 4 channels;

ii) Determine intensity and noise values for all the spots in each image;

iii) Save the positions of the spots for each image;

iv) Save the intensities for the spots;

v) Merge the spots from the 4 channels using pre-defined offsets; and vi) Save the preliminary template.

In this example, preprocessing steps were subsumed within steps (a) and (b) of the basic image processing method described above.

Offsets and Offset-Less Template Generation

The system checked to ensure that the DefaultOffsets were valid on a per-tile basis. This was done by looking at the relative offsets resulting from template cycle registration using the preliminary template. If those relative offsets differed from the DefaultOffsets by greater than 1 pixel, then offset-less generation was performed for the tile. Offset-less template generation works by finding spots in each image, registering channel A against channel C (utilizing the crosstalk between A and C), then registering and merging spots across all cycles to one template. Each of these steps is described with respect to FIG. 2B as follows:

A golden cycle g was determined, which was the template cycle with the most spots in channels A and C. The silver cycle, s, was the runner up cycle. Image A from the golden cycle (Ag) became the frame of reference. Everything else was registered against it, directly or indirectly. The registration and merge steps were performed as follows:

Register Cg against Ag;
Merge Ag and Cg to form reference (A+C)g;
Merge As and Cs to (A+C)s;
Register against (A+C)g;
Register Gg and Tg against (A+C)s;
Register all other images (An, Cn, Gn, Tn) against (A+C)g;
Merge spot lists together at the end of the procedure;
Spots with higher signal-to-noise are saved.

As a result of the above template generation process, new offsets were generated and an offsets file was created for that tile. Once the template, and corresponding offsets file, were generated, each cycle's images were registered and extracted against the template. Since, at the time the actual template was generated, 4 cycles had already been imaged, those cycles had to be registered and extracted in order to catch up to the imaging. Implementation of the current template generation methods allowed registration of images against the template to substantially lag behind image acquisition and then catch up. In practice, the system fell behind one or two cycles due to template generation, but usually caught up to real time by cycle 4 or 5.

In addition to the foregoing, a new DefaultOffsets file was generated by combining the new offset information produced for each tile. For example, after two-thirds of the tiles had their templates generated, the system went back and loaded all of the offsets files that had been generated, and calculated a median offset. If this median offset differed by more than 0.15 pixels from the DefaultOffsets (or if there were no DefaultOffsets in the first place) then the system saved the DefaultOffsets file and restarted template generation for all tiles using the new DefaultOffsets.

Comparison of Improved Procedure with Standard Procedure

Figure 3A:
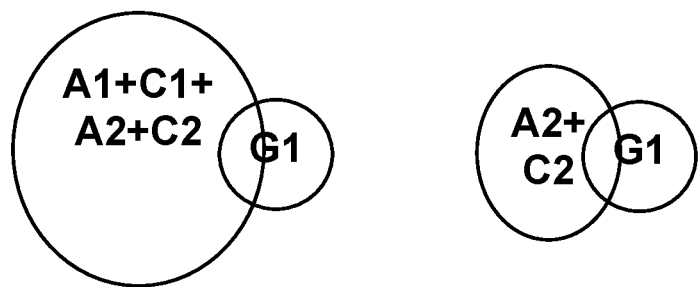
FIGS. 3A and 3B are diagrams showing some advantages of certain embodiments of template generation methods described herein.
Figure 3B:
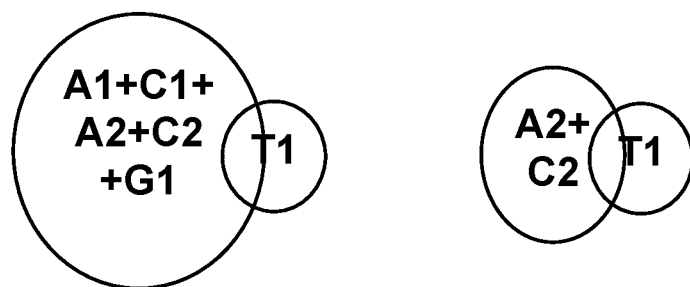

FIGS. 3A and 3B illustrate advantages of the improved template generation procedure set forth herein as compared to previously-applied procedures. For example, in the previously-applied procedure depicted in FIG. 2A, the overlap between certain features can be small enough that a feature might be mis-registered. For example, as shown in the left-most Venn diagram in FIG. 3A, the overlap between the feature shown as G1 and the area covered by other features shown as A1+C1+A2+C2 is small enough that it is easy to mis-register. However, the shared area becomes greater when G1 is registered against A2+C2 using the procedure depicted in FIG. 2B as is shown in the right-most Venn diagram in FIG. 3A. This effect becomes even greater in subsequent registration steps, as shown in FIG. 3B (compare left and right Venn diagrams).

Example 3

Template Generation: Signal Selection

This example demonstrates how template generation was performed during a DNA sequencing run. A step in the processing of image data from a sequencing instrument is the process of discarding duplicate signals, e.g., two or more signals included in the template produced from the same feature. In this example, signals were ordered first by detection count, then by brightness relative to neighbors.

Spots were ordered first by detection count. A detection count for a particular spot was defined as the number of cycles where any spot was detected within 0.5 pixels of the particular spot. Spots were then ordered by brightness relative to neighbors. For this calculation, the following equation was used:

Ratio=4*Intensity[$X,Y$]/($NW+NE+SW+SE$)

In the above equation, NW was defined as: max(Noise [$X,Y$], Intensity [$X-1, Y-1$]). NE, SW and SE are defined similarly. The max was taken to avoid instability if neighboring intensities were less than or equal to zero.

In other experiments, the ClusterDistance radius (distance between clusters, which is also referred to herein as "ClusterDistance") was dropped from 2.0 pixels to as low as 1.0 pixels, depending on the data density. Making either of these changes (ordering spots as described above or lowering the ClusterDistance radius) improved the percentage of clusters meeting the threshold requirements to be characterized as a signal cluster corresponding to a feature (passing filter). In other words, either by ordering spots by detection count and then brightness or by reducing the size of the distance between clusters, increases the percentage of clusters passing filter ("ClustersPF"). When both changes were made, the best overall results were achieved, with over 800,000 clusters passing filters per $mm^2$. Template generation with a ClusterDistance radius of 1.5 pixels gave a significant improvement in the number of clusters passing filters at high density.

Dynamic Scaling of ClusterDistance

If ClusterDistance is too small, the result can be a significant percentage of duplicate signals. A desired percentage of duplicates was less than 1%. In order to reduce the number of duplicate signals ClusterDistance was sized to accommodate the density of the arrays so as to reduce the number of duplicates. This process involves dynamic scaling for ClusterDistance. In this process, the median spot density (in clusters per $mm^2$) was computed across the template images. If the configured ClusterDistance was too small for this spot density, then ClusterDistance value was increased for the tile to potentially reduce duplicates. For densities below 250,000 clusters per $mm^2$, a minimum ClusterDistance of 2.5 pixels was enforced.

When the ClusterDistance as configured above was set at 1.0 pixels, the result was only ~0.3% duplicates amongst clusters passing filter at the highest densities.

Example 4

Phasing Estimation

This example describes an embodiment wherein a phasing estimation was performed to adjust the observed intensities in a way that reduces the noise created by phased molecules. In this example, it was assumed that a fixed fraction of molecules in each cluster become "phased" at each cycle, in the sense that those molecules fall one base behind in sequencing.

Assuming that p is that fraction, then after cycle 1, a given cluster has (1−p) percent its molecules on cycle 2, with p percent on cycle 1. After cycle 2, $(1-p)^2$ will be on cycle 3, $p(1-p)$ will be on cycle 2, and $p^2$ will be on cycle 1. In general, after cycle n, the fraction of molecules that will be phased by k cycles will be:

$$\binom{n}{k}(1-p)^{n-k}p^k$$

If p and n are "small" then the intensity contribution from molecules phased more than 1 cycle (second order terms and higher) is small. In that case, the ratio can be taken of intensities of molecules that are phased by one cycle and those that are not phased to get:

$$\frac{np(1-p)^{(n-1)}}{(1-p)^n} = \frac{np}{(1-p)} \cong np$$

To estimate p, the following method was applied for cycles 3 through 12. The first two cycles were ignored as the first cycle is often "T" only and this method required a roughly equal number of each base to be present in two consecutive cycles.

For channel "A", all clusters were determined in cycle N for which "A" is not the brightest intensity. Clusters were divided into two groups: clusters where the previous base call in cycle N−1 was "A" and clusters where the previous base call was not "A".

For clusters where the previous call was "A", it was assumed that each cluster intensity at cycle N consists of a phasing component p and a noise component n, making the total signal p+n. Each intensity was normalized by the intensity of the brightest channel at cycle N to get (p+n)/I and then average for all clusters in the group.

For clusters where the previous call was not "A", it was assumed that each cluster intensity at cycle N consists of just a noise component n. Each intensity was normalized to get n/I and then average for all clusters in the group. Phasing at cycle N was set to the difference between average (p+n)/I and average n/I.

This process was then repeated for other cycles and determine best fit line. The slope was the phasing for color channel "A". This process was then repeated for all color channels. Phasing across color channels was averaged to obtain phasing parameter for entire run.

The methods and systems provided herein also estimated the pre-phasing parameter q the same way but used cycles 2 through 11 and compared intensities against cycle N+I rather than cycle N−1. If a control lane was specified, only tiles from that lane were used to calculate these parameters.

Once the phasing and pre-phasing parameters were calculated, a phasing matrix was created to model phasing effects. This was done by creating an N×N matrix where N is the total number of cycles. Rows represent cycles and columns represent template termination position. Without phasing or pre-phasing, termination position was expected to match the cycle number at any given cycle. In other words, the probability that the termination position at cycle n is equal to position n is 1, and 0 elsewhere. For 3 cycles, the matrix would look like:

| 1 | 0 | 0 |
|---|---|---|
| 0 | 1 | 0 |
| 0 | 0 | 1 |

With phasing and pre-phasing, there are now three probabilities to consider. First, the probability that the position at cycle n is equal to n−1 is p, where p is the phasing parameter previously calculated. Second, the probability that the position at cycle n is equal to n+1 is q, where q is the pre-phasing parameter. Third, the probability that the position matches the cycle number, i.e. position at cycle n is equal to n, is now 1−p−q. Thus, the probability that the position at cycle i is j, or P(i,j), is the sum of 3 contributing probabilities:

p*P(i−1,j): the probability that phasing occurred; position did not change from previous cycle.

(1−p−q)*P(i−1,j−1): the probability that no phasing or pre-phasing occurred; position incremented 1 from previous cycle.

q*P(i−1,j−2): the probability that pre-phasing occurred; position incremented 2 from previous cycle.

With this definition, the following phasing matrix was built.

Example 5

Real Time Metrics

This example describes an embodiment wherein real time metrics of the quality of a sequencing run are described. The system in this embodiment provided real-time metrics in two forms. The first was the Status.xml page within the Data folder. This page offered several views. The Run Info view showed general run information such as run time and settings. The Tile Status view displayed the current processing state and cycle of each tile. The Charts view displayed average metrics for each tile visually across the physical flow cell. Average metrics included cluster density, % cluster passing filter, and intensity, focus quality, and % quality score greater than Q30 by color and cycle. The Cluster Density view displayed a box plot representing the distribution of cluster density by lane. The data in this plot was populated as soon as the first cycle was processed. However, during template generation, the number of clusters in the temporary reference was only an estimate (actually, an under-estimate) of the number of clusters in the final template, which was generated in cycle 4. Therefore, the values changed from cycle 1 through cycle 4. However, they did not change after cycle 4. The data points used to generate this plot were written to file "NumClusters by lane.txt" in the Data/reports directory.

The Intensity & Focus Quality view displayed two box plots. The first plot represented the distribution of 90th percentile raw intensity values grouped by cycle and color channel. This plot provided an indication of the intensity decay. The data points used to generate this plot were written to file "Intensity by Color and Cycle.txt". The second plot represented the distribution of focus quality grouped by cycle and color channel. The data points used to generate this plot were written to file "FWHM by Color and Cycle.txt".

Another way real-time metrics were reported was through the .BRO files (by default, this was enabled, but can be disabled through the config file). These were XML files that contain statistics at an image-level. A single .bro file contained all of the statistics for all of the tiles in a given lane for a given cycle.

|     | Pos j = 1 | Pos j = 2 | Pos j = 3 | ... Pos j = N |
|-----|-----------|-----------|-----------|---------------|
| 1   | (1 − p − q) | q | 0 | ... 0 |
| 2   | p * P(1, 1) | (1 − p − q) * P(1, 1) + P * P(1, 2) | q * P(1, 1) + (1 − p − q) * P(1, 2) + P * P(1, 3) | ... 0 |
| ... | ... | ... | ... | ... |
| N   | p * P(N − 1, 1) | (1 − p − q)* P(N − 1, j − 1) + P * P(N − 1, j) | q * P(N − 1, j − 2) + (1 − p − q) * P(N − 1, j − 1) + P * P(N − 1, j) | ... q * P(N − 1, N − 2) + (1 − p − q) * P(N − 1, N − 1) + P * P(N − 1, N) |

To phase correct intensities for a given cycle, the inverse of the phasing matrix was taken and the matrix row corresponding to the cycle was extracted. Probabilities less than a threshold of 0.01 were set to 0, thus creating a phasing window which was applied to the vector of observed intensities values. Finally, the vector of actual intensities for cycles 1 through N was the product of phasing matrix inverse and observed intensities for cycles 1 through N.

$$I_a = M^{-1} \times I_o$$

The above description discloses several methods and systems of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein including, but not limited to, published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

What is claimed is:

1. A system for base calling a nucleotide in a nucleic acid molecule, comprising:
    a processor;
    a storage device; and
    a program comprising instructions for:
        acquiring fluorescent emissions from labeled nucleotides hybridized to a cluster of identical nucleic acids bound to a substrate;
        calculating the fraction of labeled nucleotides in the cluster that are out of phase;
        identifying a particular base called nucleotide based on the acquired fluorescent emissions and the calculated fraction of labeled nucleotides that are out of phase; and
        assigning a quality score to the particular base called nucleotide based on the identification.

2. The system of claim 1, wherein the system comprises a CMOS detector and the program comprises instructions for acquiring fluorescent emissions from images gathered by the CMOS detector.

3. The system of claim 1, wherein the system comprises a nucleic acid sequencing instrument that performs multiple cycles of sequencing by synthesis.

4. The system of claim 3, wherein calculating the fraction of labeled nucleotides in the cluster that are out of phase comprises assigning a fixed fraction of the labeled nucleotides in the cluster to be out of phase during each cycle of the multiple cycles of the sequencing by synthesis.

5. The system of claim 3, wherein calculating the fraction of labeled nucleotides in the cluster that are out of phase comprises calculating the fraction of labeled nucleotides that are out of phase over n cycles.

6. The system of claim 3, wherein calculating the fraction of labeled nucleotides in the cluster that are out of phase comprises generating a phasing matrix that models the phasing effects at any cycle of the multiple cycles of the sequencing by synthesis.

7. The system of claim 6, wherein generating the phasing matrix comprises creating an N×N matrix where N is the total number of the multiple cycles of the sequencing by synthesis, each row of the matrix represents cycles and each column of the matrix represents a termination position of a template nucleic acid in the cycle.

8. The system of claim 3, wherein assigning a quality score comprises generating an output file which contains a quality score for each cycle of the multiple cycles, for the cluster.

9. The system of claim 1, wherein assigning the quality score to the particular base called nucleotide comprises calculating a set of predictor values for the base call.

10. The system of claim 9, wherein the program further comprises using the predictor values to look up the quality score in a quality table.

11. The system of claim 9, wherein the predictor values are selected from the group consisting of: approximate homopolymer; intensity decay; penultimate chastity; signal overlap with background (SOWB) and shifted purity G adjustment.

12. The system of claim 1, wherein the program comprises a state machine which monitors a file system within the storage device for the presence of a new file.

13. They system of claim 12, wherein identifying the labeled nucleotides results in generation of a base call file in the storage device.

14. The system of claim 13, wherein the quality score is calculated from data in the base call file stored on the storage device.

15. The system of claim 1, further comprising discounting quality scores which are below a predetermined threshold.

16. A method for base calling a nucleotide in a nucleic acid molecule having a particular quality score, comprising:
    acquiring fluorescent emissions from labeled nucleotides hybridized to a cluster of identical nucleic acids bound to a substrate, wherein the labeled nucleotides should be the same;
    calculating the fraction of labeled nucleotides in the cluster that are out of phase;
    identifying the labeled nucleotides based on the acquired fluorescent emissions and the calculated fraction of labeled nucleotides to identify the particular base called nucleotide; and
    assigning a quality score to the particular base called nucleotide based on the identification.

17. The method of claim 16, wherein the method is repeated to perform multiple cycles of sequencing by synthesis.

18. The method of claim 17, wherein calculating the fraction of labeled nucleotides in the cluster that are out of phase comprises assuming a fixed fraction of the labeled nucleotides in the cluster become out of phase during each cycle of the multiple cycles of the sequencing by synthesis.

19. The method of claim 17, wherein calculating the fraction p of labeled nucleotides in the cluster that are out of phase, after cycle n, comprises calculating the fraction of molecules that will be phased by k cycles using the formula:

$$\binom{n}{k}(1-p)^{n-k}p^k.$$

20. The method of claim 17, wherein calculating the fraction of labeled nucleotides in the cluster that are out of phase comprises generating a phasing matrix to model the phasing effects at any cycle of the multiple cycles of the sequencing by synthesis.

21. The method of claim 16, wherein the method comprises monitoring a file system to determine when a specimen comprising the nucleotide is ready to advance from one state to the next state in a state machine.

22. They method of claim 21, wherein identifying the labeled nucleotides results in generation of a base call file.

23. The method of claim 22, wherein assigning a quality score comprises reading the base call file and calculating a quality score.

24. The method of claim 16, further comprising discounting quality scores which are below a predetermined threshold.

* * * * *

UNITED STATES PATENT AND TRADEMARK OFFICE
CERTIFICATE OF CORRECTION

| | | |
|---|---|---|
| PATENT NO. | : 11,676,275 B2 | Page 1 of 1 |
| APPLICATION NO. | : 17/445994 | |
| DATED | : June 13, 2023 | |
| INVENTOR(S) | : Francisco Jose Garcia et al. | |

It is certified that error appears in the above-identified patent and that said Letters Patent is hereby corrected as shown below:

In the Claims

In Column 48, Claim 13, Line 9 (Approx.), delete "They" and insert --The--.

In Column 48, Claim 22, Line 58 (Approx.), delete "They" and insert --The--.

Signed and Sealed this
Twenty-fifth Day of July, 2023

Katherine Kelly Vidal
*Director of the United States Patent and Trademark Office*